(12) United States Patent
Zheng et al.

(10) Patent No.: US 10,382,242 B2
(45) Date of Patent: Aug. 13, 2019

(54) NETWORK LISTENING METHOD AND DEVICE

(71) Applicant: Huawei Technologies Co., Ltd., Shenzhen, Guangdong (CN)

(72) Inventors: Juan Zheng, Beijing (CN); Xiaoan Fan, Beijing (CN); Yongxia Lyu, Beijing (CN); Brian Classon, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 15/266,823

(22) Filed: Sep. 15, 2016

(65) Prior Publication Data

US 2017/0005848 A1 Jan. 5, 2017

Related U.S. Application Data

(63) Continuation of application No. PCT/CN2014/073629, filed on Mar. 18, 2014.

(51) Int. Cl.
*H04L 27/26* (2006.01)
*H04W 56/00* (2009.01)
(Continued)

(52) U.S. Cl.
CPC ........ *H04L 27/2655* (2013.01); *H04L 27/261* (2013.01); *H04L 27/2675* (2013.01);
(Continued)

(58) Field of Classification Search
CPC .............. H04L 27/261; H04L 27/2655; H04L 27/2675; H04L 5/0007; H04L 5/0048;
(Continued)

(56) References Cited

U.S. PATENT DOCUMENTS 9,320,047 B2 * 4/2016 Li ....................... H04W 72/085
9,392,563 B2 * 7/2016 Guo ................. H04W 56/0015
(Continued)

FOREIGN PATENT DOCUMENTS

CN 101494484 A 7/2009
CN 201413452 Y 2/2010
(Continued)

OTHER PUBLICATIONS

Pantech & Curitel, "PRS patterns based on Modular Sonar sequence", 3GPP TSG RAN WG1 #57, May 4-8, 2009, 13 pages.
(Continued)

*Primary Examiner* — Kevin D Mew

(57) ABSTRACT

Embodiments of the present invention provide a network listening method and device, where the method includes: determining, by a first device according to a type of a network listening resource, a time-frequency pattern that is of a first sequence and is corresponding to the network listening resource of this type; and then transmitting the first sequence to a second device by using the time-frequency pattern of the first sequence, so that the second device performs network listening according to the first sequence. The time-frequency pattern of the first sequence determined in this process is a time-frequency pattern obtained by transforming a time-frequency pattern of a base sequence, and a network listening signal obtained therefrom, that is, the time-frequency pattern of the first sequence, is simple, which can achieve a purpose of reducing complexity of generating a network listening signal and computational complexity of parsing a network listening signal.

20 Claims, 27 Drawing Sheets

(51) Int. Cl.
*H04W 72/00* (2009.01)
*H04W 16/32* (2009.01)
*H04L 5/00* (2006.01)

(52) U.S. Cl.
CPC ......... *H04W 56/00* (2013.01); *H04W 56/001* (2013.01); *H04L 5/0007* (2013.01); *H04L 5/0048* (2013.01); *H04L 5/0055* (2013.01); *H04W 16/32* (2013.01); *H04W 72/00* (2013.01)

(58) Field of Classification Search
CPC .. H04L 5/0055; H04W 56/00; H04W 56/001; H04W 16/32; H04W 72/00
See application file for complete search history.

(56) References Cited

U.S. PATENT DOCUMENTS

| | | | | |
|---|---|---|---|---|
| 9,661,601 | B2* | 5/2017 | Fischer | H04W 64/00 |
| 2010/0220597 | A1* | 9/2010 | Ji | H04W 16/10 |
| | | | | 370/241 |
| 2010/0265910 | A1* | 10/2010 | Suo | H04L 5/0048 |
| | | | | 370/330 |
| 2010/0273506 | A1 | 10/2010 | Stern-Berkowitz et al. | |
| 2010/0322184 | A1 | 12/2010 | Xiao | |
| 2011/0158200 | A1* | 6/2011 | Bachu | H04L 5/0007 |
| | | | | 370/330 |
| 2011/0275382 | A1* | 11/2011 | Hakola | H04W 24/10 |
| | | | | 455/452.2 |
| 2012/0020302 | A1 | 1/2012 | Xiao | |
| 2013/0176874 | A1* | 7/2013 | Xu | H04W 52/242 |
| | | | | 370/252 |
| 2013/0250847 | A1* | 9/2013 | Lee | H04L 5/0051 |
| | | | | 370/315 |
| 2014/0056165 | A1* | 2/2014 | Siomina | H04B 1/7083 |
| | | | | 370/252 |
| 2014/0219255 | A1* | 8/2014 | Eyuboglu | H04W 72/12 |
| | | | | 370/336 |
| 2014/0302856 | A1* | 10/2014 | Nory | H04W 48/10 |
| | | | | 455/437 |
| 2015/0109969 | A1* | 4/2015 | Celebi | H04L 5/0085 |
| | | | | 370/278 |
| 2015/0215879 | A1* | 7/2015 | Zhu | H04W 56/0015 |
| | | | | 370/350 |
| 2015/0373654 | A1* | 12/2015 | Yasukawa | H04W 56/00 |
| | | | | 370/338 |
| 2016/0007310 | A1* | 1/2016 | Yi | H04W 56/0015 |
| | | | | 370/338 |
| 2016/0187458 | A1* | 6/2016 | Shah | G01S 5/021 |
| | | | | 455/456.1 |
| 2016/0278030 | A1* | 9/2016 | Yi | H04W 16/32 |
| 2017/0195110 | A1* | 7/2017 | Ruffini | H04L 7/0016 |
| 2017/0237463 | A1* | 8/2017 | Zheng | H04W 56/00 |
| | | | | 370/328 |

FOREIGN PATENT DOCUMENTS

| | | |
|---|---|---|
| CN | 102377714 A | 3/2012 |
| CN | 102761956 A | 10/2012 |
| CN | 102804636 A | 11/2012 |
| CN | 103053207 A | 4/2013 |
| EP | 1890445 A2 | 2/2008 |

OTHER PUBLICATIONS

"3rd Generation Partnership Project; Technical Specification Group Services and Systems Aspects; Telecommunications management; Evolved Universal Terrestrial Radio Access Network (E-UTRAN) Network Resource Model (NRM) Integration Reference Point (IRP); Information Service (IS) (Release 11)", 3GPP TS 28.658 V11.3.0, Dec. 2013, 49 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.0.0, Dec. 2013, 208 pages.

Samsung, "Discussion on the detection timing of small cell discovery signal," R1-140371, 3GPP TSG RAN WG1 #76, Prague, Czech Republic, Feb. 10-14, 2014, 4 pages.

Huawei, et al., "Text proposal on feasibility and benefits of radio-interface based synchronization mechanisms," R1-134017, 3GPP TSG RAN WG1 Meeting #74, Barcelona, Spain, Aug. 19-23, 2013, 6 pages.

* cited by examiner

A second device receives a first sequence transmitted by a first device by using a time-frequency pattern of the first sequence, where the time-frequency pattern of the first sequence is a time-frequency pattern obtained by transforming a time-frequency pattern of a base sequence, and the time-frequency pattern of the first sequence is determined by the first device according to a type of a network listening resource    — 201

The second device performs network listening according to the first sequence    — 201

FIG. 11

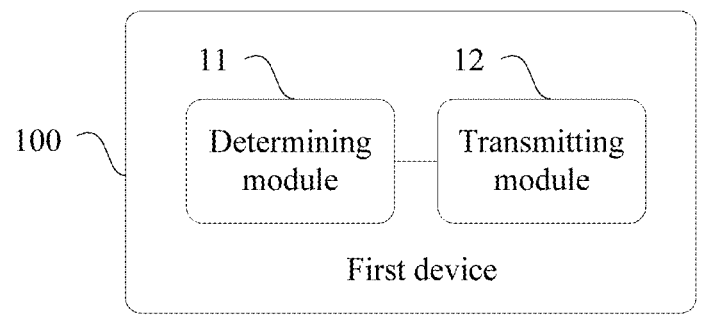

FIG. 12

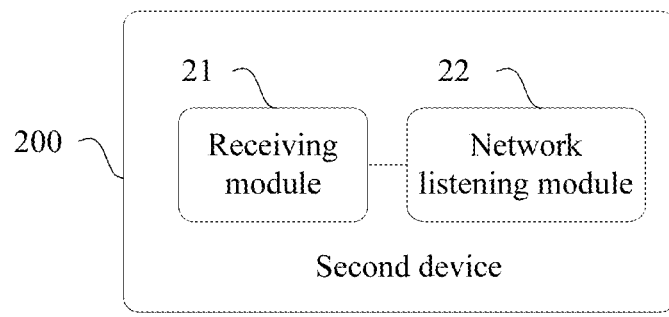

FIG. 13

NETWORK LISTENING METHOD AND DEVICE

CROSS-REFERENCE TO RELATED APPLICATIONS

This application is a continuation of International Application No. PCT/CN2014/073629, filed on Mar. 18, 2014, the disclosure of which is hereby incorporated by reference in its entirety.

TECHNICAL FIELD

Embodiments of the present invention relate to wireless communications technologies, and in particular, to a network listening method and device.

BACKGROUND

Currently, to meet a soaring requirement for data service traffic, a large quantity of small cells are deployed densely in some indoor or outdoor hotspot areas. A capacity and coverage of an original macro cell are enhanced by using coverage of a small cell, so as to improve user experience. To ensure normal data transmission between a macro cell and each small cell and between small cells, clock synchronization needs to be implemented between the small cells and between the small cell and the macro cell.

In the prior art, clock synchronization is implemented by means of network listening. Specifically, some small cells or macro cells achieve clock synchronization by using a clock synchronization signal provided by an external synchronization source, and as synchronization source cells, provide a clock synchronization signal for a target cell, so that the target cell also achieves synchronization. The external synchronization source may be, for example, global positioning system (GPS) or wired network clock synchronization. In this process, the synchronization source cell transmits a network listening signal to the target cell, so that the target cell can implement clock synchronization with the synchronization source cell according to the network listening signal. To reduce an effect on user equipment served by the target cell, the target cell may receive, by using different network listening resources, for example, by utilizing a non-unicast region in a multimedia broadcast multicast service single frequency network (MBSFN) subframe or by using a guard period (GP) in a special subframe or by using an uplink subframe or by using a downlink subframe, the network listening signal transmitted by the synchronization source cell. How to generate a network listening signal more efficiently for network listening resources of different types has become an urgent problem to be resolved.

SUMMARY

Embodiments of the present invention provide a network listening method and device, where a simple network listening signal is generated to reduce complexity of generating a network listening signal and computational complexity of parsing a network listening signal.

According to a first aspect, an embodiment of the present invention provides a network listening method, including:

determining, by a first device according to a type of a network listening resource, a time-frequency pattern that is of a first sequence and is corresponding to the type of the network listening resource, where the time-frequency pattern of the first sequence is a time-frequency pattern of a base sequence, and the first sequence is a sequence used by a second device to perform network listening; and transmitting, by the first device, the first sequence to the second device by using the time-frequency pattern of the first sequence.

According to a second aspect, an embodiment of the present invention provides a network listening method, including:

receiving, by a second device, a first sequence transmitted by a first device by using a time-frequency pattern of the first sequence, where the time-frequency pattern of the first sequence is a time-frequency pattern of a base sequence, and the time-frequency pattern of the first sequence is determined by the first device according to a type of a network listening resource; and performing, by the second device, network listening according to the first sequence.

According to a fifth aspect, an embodiment of the present invention provides a first device, including:

a processor, configured to determine, according to a type of a network listening resource, a time-frequency pattern that is of a first sequence and is corresponding to the type of the network listening resource, where the time-frequency pattern of the first sequence is a time-frequency pattern obtained by transforming a time-frequency pattern of a base sequence, and the first sequence is a sequence used by a second device to perform network listening; and a transmitter, configured to transmit the first sequence to the second device by using the time-frequency pattern of the first sequence determined by the processor.

According to a sixth aspect, an embodiment of the present invention provides a second device, including:

a receiver, configured to receive a first sequence transmitted by a first device by using a time-frequency pattern of the first sequence, where the time-frequency pattern of the first sequence is a time-frequency pattern obtained by transforming a time-frequency pattern of a base sequence, and the time-frequency pattern of the first sequence is determined by the first device according to a type of a network listening resource; and a processor, configured to perform network listening according to the first sequence received by the receiver.

In some embodiments, the time-frequency pattern of the first sequence may be:

a time-frequency pattern determined by the first device by transforming the time-frequency pattern of the base sequence according to the type of the network listening resource; or a time-frequency pattern determined by the first device according to a correspondence between the type of the network listening resource and the time-frequency pattern of the first sequence; or a time-frequency pattern obtained by transforming the time-frequency pattern of the base sequence after the first device determines, according to a correspondence between the type of the network listening resource and a transformation manner of the time-frequency pattern of the base sequence, a transformation manner that is of the time-frequency pattern of the base sequence and is corresponding to the type of the network listening resource.

In some embodiments, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

In some embodiments, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource.

In some embodiments, the network listening resource includes at least one of the following resources: a multimedia broadcast multicast service single frequency network (MBSFN) subframe, a guard period (GP) of a special subframe, an uplink subframe, and a downlink subframe; and the time-frequency pattern of the first sequence is generated by the first device on the network listening resource according to the type of the network listening resource.

In some embodiments, when the second device is a frequency division duplex FDD standard device, the network listening resource is a MBSFN subframe; or when the second device is a time division duplex (TDD) standard device, the network listening resource is a MBSFN subframe, a guard period (GP) of a special subframe, or an uplink subframe.

In some embodiments, the network listening resource includes at least one of the following resources: a subframe whose subframe index number is 1 and/or a subframe whose subframe index number is 6 in a FDD system, and a subframe whose subframe index number is 1 and/or a subframe whose subframe index number is 6 in a TDD system; and the time-frequency pattern of the first sequence is generated by the first device on the network listening resource according to the type of the network listening resource.

In some embodiments, a network listening resource in which the time-frequency pattern of the first sequence is located is determined by the first device according to network configuration.

In some embodiments, the time-frequency pattern of the base sequence is determined by the first device according to network configuration.

In some embodiments, the time-frequency pattern of the base sequence includes: a time-frequency pattern of a positioning reference signal (PRS) and/or a time-frequency pattern of a cell-specific reference signal (CRS).

According to the network listening method and device provided in the embodiments of the present invention, after determining, according to a type of a network listening resource, a time-frequency pattern that is of a first sequence and is corresponding to the network listening resource of this type, a first device transmits the first sequence to a second device by using the time-frequency pattern of the first sequence, so that the second device performs network listening according to the first sequence. The time-frequency pattern of the first sequence determined in this process is a time-frequency pattern obtained by transforming a time-frequency pattern of a base sequence, and a network listening signal obtained therefrom, that is, the time-frequency pattern of the first sequence, is simple, which can achieve a purpose of reducing complexity of generating a network listening signal and computational complexity of parsing a network listening signal.

BRIEF DESCRIPTION OF THE DRAWINGS

FIG. 11 is a flowchart of Embodiment 2 of a network listening method of the present invention;

FIG. 12 is a schematic structural diagram of Embodiment 1 of a first device according to the present invention;

FIG. 13 is a schematic structural diagram of Embodiment 1 of a second device according to the present invention;

DETAILED DESCRIPTION

Figure 1:
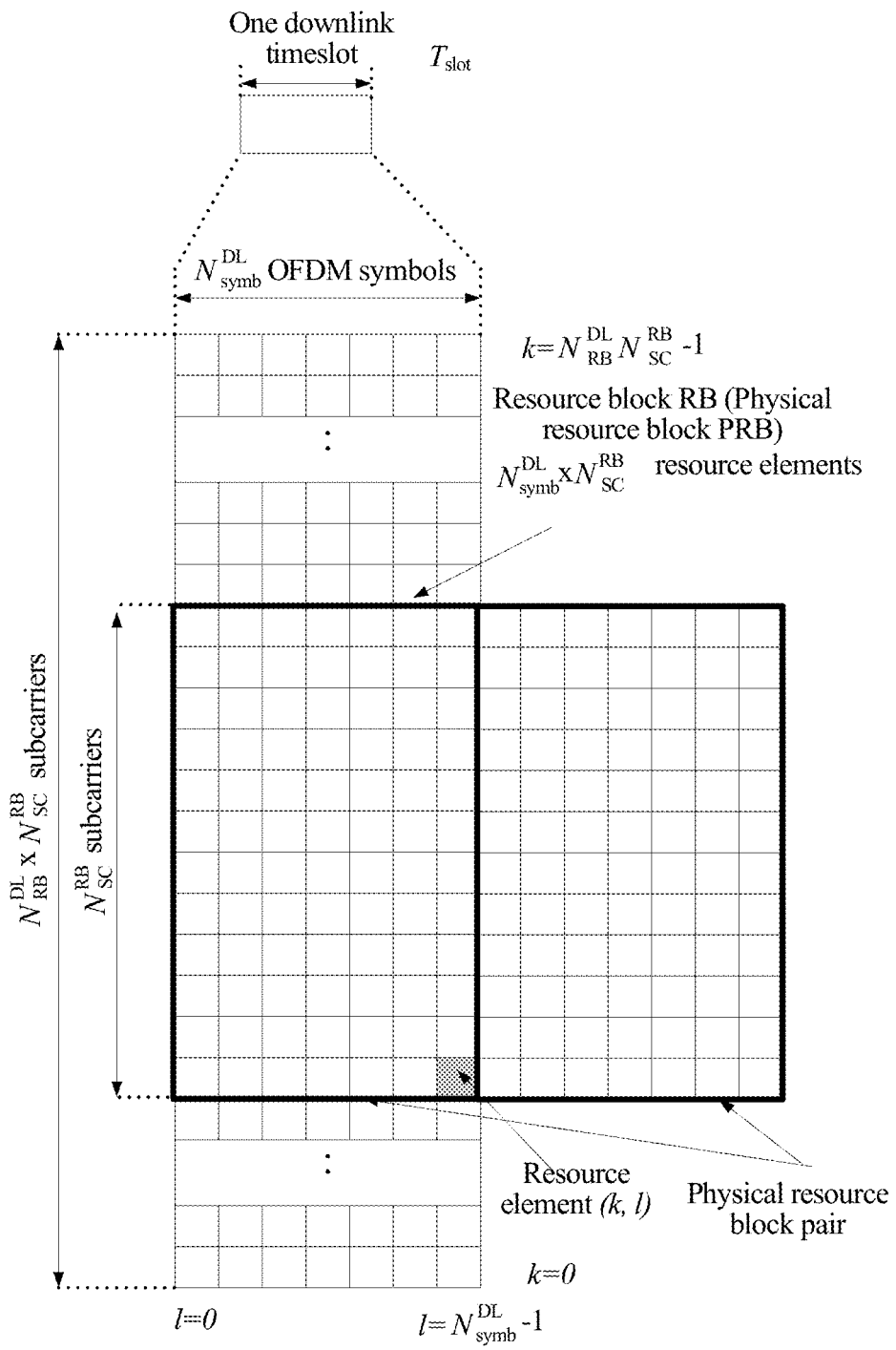
FIG. 1 is a schematic diagram of a time-frequency resource of an LTE system to which a network listening method of the present invention is applicable.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention are applicable to various wireless communications systems. For clear understanding of the present invention, the following first details, by using an example in which the wireless communications system is specifically long term evolution (LTE) or long term evolution advanced (LTE-A), network listening, a first device, a second device, a base sequence, a time-frequency pattern of a base sequence, and the like that are applicable to the embodiments of the present invention.

Network listening: Generally, network listening includes clock synchronization, carrier selection, energy detection, signal parsing, channel estimation, device discovery, interference detection, channel quality measurement, and the like. Unless otherwise described, the following describes the present invention in detail by using an example in which network listening is specifically clock synchronization.

First device and second device: Because network listening exists between network elements, between a network element and user equipment, or between user equipments, unless otherwise described in the following embodiments, a first device is a device that provides a network listening signal, and a second device is a device that implements network listening by using the network listening signal, where the first device may be a network element or user equipment, and likewise, the second device may also be a network element or user equipment, which is not limited in the present invention. The network element may be, for example, an evolved NodeB (eNB), a small cell, or a macro base station (which may also be referred to as a macro cell), where the concept of a cell is equivalent to that of a base station or the like in the embodiments of the present invention. The small cell is characterized in low transmit power, a small coverage region, and the like. Specifically, the small cell may further include a metro cell, a micro cell, a pico cell, a femto cell, and the like. In the embodiments of the present invention, when network listening is specifically clock synchronization, the first device may be a base station that provides a clock synchronization signal, and the second device may be a base station that receives the clock synchronization signal provided by the first device; or when network listening is interference detection, the first device may be an interference source, and the second device may be an interfered-with device. It should be noted that the first device and the second device are merely two relative concepts. By using user equipment as an example, when the user equipment provides a network listening signal, the user equipment may be used as the first device; when the user equipment implements network listening according to a network listening signal, the user equipment may be used as the second device.

Base sequence: To help a reader to understand a base sequence, concepts of common time-frequency resources in an LTE system are briefly described first. Specifically, reference may be made to FIG. 1.

FIG. 1 is a schematic diagram of a time-frequency resource of an LTE system to which a network listening method of the present invention is applicable. As shown in FIG. 1, in the LTE system, a smallest time-frequency resource unit that carries data is a resource element (RE). The RE may be uniquely identified by using a subcarrier index k and an orthogonal frequency division multiplexing (Orthogonal Frequency Division Multiplexing, OFDM) symbol index l within one timeslot, where k is k=0, . . . , $N_{RB}^{DL}N_{sc}^{RB}-1$, a range of l is l=0, 1 . . . , $N_{symb}^{DL}-1$, $N_{RB}^{DL}$ indicates a quantity of resource blocks (Resource Block, RB) included in system downlink bandwidth, and values of $N_{sc}^{RB}$ and $N_{symb}^{DL}$ are related to a type of a cyclic prefix (CP). Specifically, referring to Table 1, Table 1 is a prefix attribute table that is applicable to the embodiments of the present invention. One RB includes $N_{symb}^{DL}$ consecutive OFDM symbols on a time domain resource, and includes $N_{sc}^{RB}$ consecutive subcarriers on a frequency domain resource. That is, one RB includes $N_{symb}^{DL} \times N_{sc}^{RB}$ REs and is corresponding to one timeslot (slot) in a time domain and 180 KHz in a frequency domain, where one timeslot includes $N_{symb}^{DL}$ consecutive OFDM symbols, and one subframe includes two timeslots. Two RBs that are located in different timeslots of a same subframe and have a same frequency domain resource may be referred to as an RB pair. By using a normal cyclic prefix as an example, two RBs that are located in different timeslots of a same subframe and have a same frequency domain resource include 14*12 REs in total.

TABLE 1

| Cyclic prefix type | Subcarrier interval | $N_{sc}^{RB}$ | $N_{symb}^{DL}$ |
|---|---|---|---|
| Normal cyclic prefix (Normal cyclic prefix) | Δf = 15 kHz | 12 | 7 |
| Extended cyclic prefix (Extended cyclic prefix) | Δf = 15 kHz | | 6 |
| | Δf = 7.5 kHz | 24 | 3 |

It should be noted that Table 1 is merely an example, and in another feasible implementation manner, the cyclic prefix type may be defined as another form, which is not limited in the present invention.

With reference to FIG. 1, it may be learned that in the embodiments of the present invention, for different network elements and/or user equipments, or for network listening resources of different types, the base sequence may be understood as a sequence with time-frequency patterns of a fixed size or a same size, or a sequence with fixed or same time-frequency patterns, or a sequence with time-frequency patterns that are mutual time-frequency shifts.

Time-frequency pattern of a base sequence: With reference to FIG. 1, a time-frequency pattern of a base sequence may be defined as a time resource and a frequency resource that are occupied by the base sequence, or may be defined as a time resource and a frequency resource that are occupied by a specific complex-valued modulation symbol after the base sequence is mapped to the specific complex-valued modulation symbol. A location of the time resource occupied by the base sequence may be indicated by using at least one of the following: a radio frame index, a subframe index, a timeslot index, and an OFDM symbol index. A location of the frequency resource occupied by the base sequence may be indicated by using at least one of the following: a subcarrier index, an RE index, an RB index, and a PRB index. A location of a time-frequency resource (that is, locations of the time resource and the frequency resource) occupied by the base sequence may be indicated by using a combination of any one or more of the foregoing indexes indicating the location of the time resource and any one or more of the foregoing indexes indicating the location of the frequency resource. Within one subframe, the time-frequency pattern of the base sequence may be represented by an RE occupied by the base sequence, or may be represented by an RE occupied by the specific complex-valued modulation symbol to which the base sequence is mapped, or may be represented by an RE occupied by the base sequence and an RE that is not occupied by the base sequence, or may be represented by an RE occupied by the specific complex-valued modulation symbol to which the base sequence is mapped and an RE that is not occupied by the specific complex-valued modulation symbol to which the base sequence is mapped. As shown in Table 1, by using a normal cyclic prefix as an example, one subframe includes 14*12 REs in total, where X REs indicate REs occupied by a base sequence, Y REs indicate REs that are not occupied by a base sequence, and X+Y may be equal to 14*12 or may be less than 14*12.

The following describes the base sequence in detail by using different network elements and/or user equipments as an example. Specifically, for different network elements and/or user equipments, within one subframe, when the foregoing base sequence is a sequence with time-frequency patterns of a fixed size, the base sequence refers to a sequence whose time-frequency patterns occupy a fixed quantity of REs; when the foregoing base sequence is a sequence with time-frequency patterns of a same size, the base sequence refers to a sequence whose time-frequency patterns occupy a same quantity of REs; when the foregoing base sequence is a sequence with fixed time-frequency patterns, the base sequence refers to a sequence whose time-frequency patterns occupy an RE at a fixed location; when the foregoing base sequence is a sequence with same time-frequency patterns, the base sequence refers to a sequence whose time-frequency patterns occupy same REs; when the foregoing base sequence is a sequence with time-frequency patterns that are mutual time-frequency shifts, the base sequence refers to a sequence with time-frequency patterns of a fixed size or a same size and whose e-frequency patterns are mutual time-frequency shifts. The time-frequency shift refers to a cyclic shift of an RE occupied by a sequence (for example, a base sequence) on a time resource and/or a frequency resource, and different time-frequency shifts may be related to dedicated parameters of different network elements or user equipments. A dedicated parameter of a network element may be an identifier of the network element. For example, a dedicated parameter of a base station may be a physical cell identifier (PCI) of the base station or may be a synchronization level of the base station; a dedicated parameter of user equipment may be an identifier of the user equipment, for example, may be a user equipment identifier (UE ID).

It should be noted that, for different network elements and/or user equipments, a base sequence may have a fixed or same sequence form, or may have different sequence forms, which is not limited herein. The base sequence may be obtained in at least one of the following manners: generated from a pseudo-random sequence, generated from a Zadoff-Chu sequence, or generated from a machine generated sequence. In the present invention, a specific base sequence may be determined by using a time-frequency pattern and at least one of the following: a sequence form, transmit power, and the like. In addition, optionally, in the embodiments of the present invention, a time-frequency pattern of a base sequence may have the following characteristics: Within a time range less than or equal to coherence time of a channel, a frequency interval between base sequences that are adjacent at frequency locations (for example, may be have a minimum frequency interval) is less than or equal to coherence bandwidth of the channel; within a frequency range less than or equal to coherence bandwidth of a channel, a time interval between base sequences that are adjacent at time locations (for example, may be have a minimum time interval) is less than or equal to coherence time of the channel. The channel refers to a channel between a device that transmits a network listening signal and a device that receives the network listening signal, for example, may be a channel between base stations (more specifically, a channel between a source base station and a target base station), or may be a channel between a base station and user equipment, or may be a channel between user equipments. The base sequences that are adjacent at the frequency locations may be located in a same OFDM symbol, or may be located in different OFDM symbols. The same OFDM symbol refers to OFDM symbols that have same OFDM indexes and are included in radio frames with a same radio frame index and subframes with a same subframe index and timeslots with a same timeslot index. The different OFDM symbols may be OFDM symbols that have same or different OFDM indexes and are included in radio frames with different radio frame indexes, or may be OFDM symbols that have same or different OFDM indexes and are included in subframes with different subframe indexes, OFDM symbols that have same or different OFDM indexes and are included in timeslots with different timeslot indexes, or may be OFDM symbols that have different OFDM indexes.

It should be noted that foregoing description of the base sequence for different network elements and/or user equipments is also applicable to a description of a base sequence for network listening resources of different types.

Figure 2:
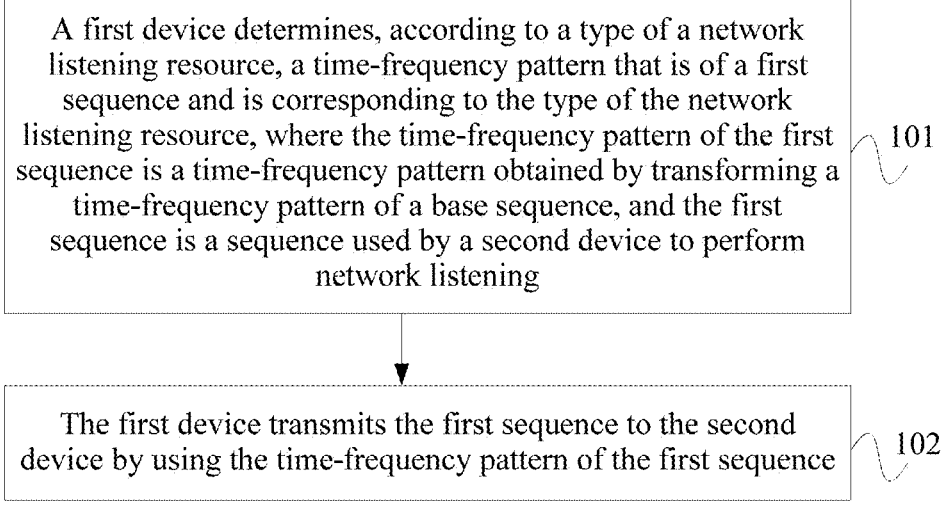
FIG. 2 is a flowchart of Embodiment 1 of a network listening method of the present invention.

FIG. 2 is a flowchart of Embodiment 1 of a network listening method of the present invention. This embodiment is executed by a first device and is applicable to a scenario in which a network listening signal needs to be efficiently generated for network listening resources of different types. Specifically, this embodiment includes the following steps:

101. The first device determines, according to a type of a network listening resource, a time-frequency pattern that is of a first sequence and is corresponding to the type of the network listening resource, where the time-frequency pattern of the first sequence is a time-frequency pattern obtained by transforming a time-frequency pattern of a base sequence, and the first sequence is a sequence used by a second device to perform network listening.

Generally, different types of network listening resources may be obtained by means of classification according to types of subframes in which the network listening resources are located. For example, the types of the network listening resource may include an MBSFN subframe, a special subframe or a GP included in a special subframe or a downlink pilot timeslot (DwPTS) included in a special subframe or an uplink pilot timeslot (UpPTS) included in a special subframe, an uplink subframe or another part of an uplink subframe except for a part corresponding to a downlink unicast control region, and a downlink subframe or another part of a downlink subframe except a unicast control region. Network listening resources in subframes of different types may be regarded as network listening resources of different types. For example, any two of a network listening resource in an MBSFN subframe, a network listening resource in a subframe in an uplink frequency band (that is, an uplink subframe), a network listening resource on a time-frequency resource of a subframe in a downlink frequency band (that is, a downlink subframe), and a network listening resource in a GP of a special subframe may be regarded as network listening resources of different types. The unicast control region refers to an region that includes transmission of at least one of the following channels: a physical downlink control channel (PDCCH), a physical hybrid ARQ indicator channel (PHICH), and a physical control format indicator channel (PCFICH). Within one subframe, the unicast control region may occupy one OFDM symbol or two OFDM symbols or three OFDM symbols, or may occupy OFDM symbols of another integer quantity less than 14, which is not limited herein. Specifically, when frequency bandwidth of a system or a network element or user equipment is relatively large, for example, when a quantity of RBs included in downlink frequency bandwidth is greater than 10, the foregoing unicast control region may occupy one or two OFDM symbols; when a quantity of RBs included in downlink frequency bandwidth is less than or equal to 10, the foregoing unicast control region may occupy two or three OFDM symbols.

In addition, alternatively, different types of network listening resources may be obtained by means of classification according to a duplex mode of a communications system. For example, network listening resources in a frequency division duplex (FDD) system and in a time division duplex (TDD) system may be regarded as network listening resources of different types. Specifically, a subframe whose subframe index number is 1 (which is corresponding to the second subframe within a radio frame) in the FDD system and a subframe whose subframe index number is 1 (which is corresponding to the second subframe within a radio frame) in the TDD system may be regarded as network listening resources of different types; or a subframe whose subframe index number is 6 (which is corresponding to the seventh subframe within a radio frame) in the FDD system and a subframe whose subframe index number is 6 (which is corresponding to the seventh subframe within a radio frame) in the TDD system may be regarded as network listening resources of different types. In the FDD system, the subframe whose subframe index number is 1 or the subframe whose subframe index number is 6 may be a subframe in an uplink frequency band or may be a subframe in a downlink frequency band, which is not limited herein; in the TDD system, the subframe whose subframe index number is 1 may be a special subframe, and the subframe whose subframe index number is 6 may be a special subframe or a downlink subframe. Based on this characteristic, in the FDD system and the TDD system, unified design of the first sequence can be implemented; in addition, because subframes with a same subframe index number are used as network listening resources in the FDD system and the TDD system, signaling configuration overheads can be reduced, that is, it is not required to configure different subframes as network listening resources for different duplex modes. For example, the subframe whose subframe index number is 1, or the subframe whose subframe index number is 6, or the subframe whose subframe index number is 1 and the subframe whose subframe index number is 6 are used as the network listening resources in both the FDD system and the TDD system. In particular, when a TDD configuration 0 is used or an enhanced interference management and traffic adaptation (eIMTA) feature is configured in the TDD system, a GP of a special subframe is preferably used as the network listening resource to reduce an effect on served user equipment, that is, the subframe whose subframe index number is 1 and/or the subframe whose subframe index number is 6 may be used as the network listening resource(s), and a GP included in the subframe whose subframe index number is 1 and/or the subframe whose subframe index number is 6 is used to carry the time-frequency pattern of the first sequence. In this case, if the subframe whose subframe index number is 1 or the subframe whose subframe index number is 6 or both are also used to carry the time-frequency pattern of the first sequence in the FDD system, unified design for FDD and TDD can be implemented and the signaling configuration overheads can be reduced. Preferably, in the FDD system, by using the subframe whose subframe index number is 1 as an example, another part of the subframe except a unicast control region may be used to carry the time-frequency pattern of the first sequence, so as to ensure that a PDCCH (for example, an uplink scheduling UL grant), a PHICH, and the like can be transmitted to the served user equipment in the unicast control region, thereby reducing an effect on the served user equipment. Such an operation is also applicable to the subframe whose subframe index is 6 in the FDD system. It should be noted that if there is a subframe-level offset between the FDD system and the TDD system, in the foregoing description, the subframe whose subframe index is 1 or whose subframe index is 6 in the FDD system may be replaced with another subframe corresponding to the subframe whose subframe index is 1 or whose subframe index is 6 in the TDD system. For example, if there is a two-subframe offset between the FDD system and the TDD system, a subframe in the FDD system corresponding to the subframe whose subframe index is 1 in the TDD system may be a subframe whose subframe index is 3, or may be a subframe whose subframe index is 9; a subframe in the TDD system corresponding to the subframe whose subframe index is 6 in the FDD system may be a subframe whose subframe index is 8, or may be a subframe whose subframe index is 4. In addition, in the TDD system, when the subframe whose subframe index number is 1 or the subframe whose subframe index number is 6 or both are used as the network listening resources, a downlink resource part, for example, a DwPTS, included in the subframe whose subframe index number is 1 and/or the subframe whose subframe index number is 6 may further be used to carry the time-frequency pattern of the first sequence. Specifically, by using the subframe whose subframe index number is 1 as an example, the $13^{th}$ OFDM symbol (an OFDM symbol whose index number is 12) included in the subframe may be used for the GP, the $14^{th}$ OFDM symbol (an OFDM symbol whose index number is 13) included in the subframe may be used for the UpPTS, and the first OFDM symbol (an OFDM symbol whose index number is 0) included in the subframe may be used for transmission of the unicast control region, for example, used for transmission of at least one of the following unicast control channels: a PDCCH, a PCFICH, and a PHICH. Afterward, another part of the subframe except the foregoing OFDM symbols is used to carry the time-frequency pattern of the first sequence, or another part of the subframe except the foregoing OFDM symbols and an OFDM symbol corresponding to a receive/transmit transition time is used to carry the time-frequency pattern of the first sequence. For example, the time-frequency pattern of the first sequence may start to occupy a time-frequency resource from the second OFDM symbol or from the third OFDM symbol or from the fourth OFDM symbol. In this example, the $12^{th}$ OFDM symbol (an OFDM symbol whose index number is 11) included in the subframe may be used for the GP, and the $13^{th}$ and the $14^{th}$ OFDM symbols (the OFDM symbols whose index numbers are 12 and 13) included in the subframe may be used for the UpPTS. Afterward, an OFDM symbol of the subframe except OFDM symbols corresponding to the GP, the UpPTS, and the unicast control region is used to carry the time-frequency pattern of the first sequence. Based on such a characteristic, a long GP does not need to be configured in the TDD system to carry the time-frequency pattern of the first sequence, which can reduce waste of resources. In the FDD system, the foregoing network listening resource corresponding to the TDD system may be configured as a downlink subframe or configured as an MBSFN subframe, and then a time-frequency pattern of the first sequence that is the same as that in the TDD system is used, so as to implement unified design. Herein, "same" means that time-frequency patterns of first sequences used in the FDD system and the TDD system are the same or are time-frequency shifts of each other.

It should be noted that when the types of the network listening resource are differentiated according to a duplex mode of a communications system, subframes that are regarded as network listening resources of different types may have a same subframe index number or may have different subframe index numbers, which is not limited herein.

In this step, the first device determines, according to the type of the network listening resource, the time-frequency pattern that is of the first sequence and is corresponding to the network listening resource of this type. For example, the first device stores a correspondence between different types of network listening resources and time-frequency patterns of first sequences, where the correspondence may be configured by a network, for example, configured by using operation, administration and maintenance (OAM), or may be predefined, for example, specified by using a standard protocol. In this way, according to a type of a network listening resource, the first device may select, from the foregoing prestored correspondence in a manner similar to a table lookup, a time-frequency pattern that is of a first sequence and is corresponding to the network listening resource of this type. Alternatively, according to a type of a network listening resource, the first device actively transforms a time-frequency pattern of a base sequence, so as to obtain a time-frequency pattern that is of a first sequence and is corresponding to the network listening resource of this type. For different types of network listening resources, a used transformation manner may be configured by a network, or may be predefined by using a standard protocol, or may be configured by a base station itself, which is not limited in the present invention. Alternatively, the first device may further store a correspondence between different types of network listening resources and different transformation manners of a time-frequency pattern of a base sequence. Similarly, the correspondence may be configured by a network, or may be defined in a standard protocol. In this way, according to a type of a network listening resource, the first device may select, from the foregoing prestored correspondence in a manner similar to a table lookup, a specific transformation manner that is of the time-frequency pattern of the base sequence and is corresponding to the network listening resource of this type, and transform the time-frequency pattern of the base sequence in the selected specific transformation manner, so as to obtain the time-frequency pattern that is of the first sequence and is corresponding to the network listening resource of this type. In this process, the first sequence may be understood as a network listening signal and is the sequence used by the second device to perform network listening. For example, when network listening is clock synchronization, the first sequence is a sequence used for clock synchronization;

when network listening is energy detection, the first sequence is a sequence used for energy detection.

In this step, for the time-frequency pattern of the first sequence, reference may be made to the definition of a time-frequency pattern of a base sequence, that is, the time-frequency pattern of the first sequence may be defined as a time resource and a frequency resource that are occupied by the first sequence, or may be defined as a time resource and a frequency resource that are occupied by a specific complex-valued modulation symbol after the first sequence is mapped to the specific complex-valued modulation symbol. For example, within one subframe, the time-frequency pattern of the first sequence may be represented by an RE occupied by the first sequence, or may be represented by an RE occupied by the specific complex-valued modulation symbol to which the first sequence is mapped, or may be represented by an RE occupied by the first sequence and an RE that is not occupied by the first sequence, or may be represented by an RE occupied by the specific complex-valued modulation symbol to which the first sequence is mapped and an RE that is not occupied by the specific complex-valued modulation symbol.

102. The first device transmits the first sequence to the second device by using the time-frequency pattern of the first sequence.

After determining the time-frequency pattern of the first sequence, the first device transmits the first sequence to the second device by using the time-frequency pattern of the first sequence, so that the second device performs network listening according to the first sequence.

According to the network listening method provided in this embodiment of the present invention, after determining, according to a type of a network listening resource, a time-frequency pattern that is of a first sequence and is corresponding to the network listening resource of this type, a first device transmits the first sequence to a second device by using the time-frequency pattern of the first sequence, so that the second device performs network listening according to the first sequence. The time-frequency pattern of the first sequence determined in this process is a time-frequency pattern obtained by transforming a time-frequency pattern of a base sequence, and a network listening signal obtained therefrom, that is, the time-frequency pattern of the first sequence, is simple, which can achieve a purpose of reducing complexity of generating a network listening signal and computational complexity of parsing a network listening signal.

Optionally, in the foregoing Embodiment 1, the time-frequency pattern of the base sequence may be predefined, for example, specified in a standard protocol, or may be configured by a network or configured by the first device itself, or may be configured by the second device and then transmitted to the first device, which is not limited in the present invention. The time-frequency pattern of the base sequence may be related to an identifier of a device that transmits the base sequence, an identifier of a device that receives the base sequence, a synchronization level of the device that transmits the base sequence, or a synchronization level of the device that receives the base sequence; or related to indexes of an OFDM symbol, a timeslot, a subframe, and a radio frame in which the base sequence is located; or related to indexes of a subcarrier, an RE, an RB, and a physical resource block (PRB) in which the base sequence is located; or related to a number of antenna ports announced on a physical broadcast channel (PBCH) by a base station that transmits the base sequence, or related to a number of antenna ports used by user equipment that transmits the base sequence, or the like, which is not limited in the present invention.

It should be noted that the foregoing device may be a base station or may be user equipment, which is not limited in the present invention.

In addition, in the foregoing Embodiment 1, the first sequence transmitted by the first device may be received by the second device by using at least one of the following: for example, a non-unicast region in an MBSFN subframe, a GP of a special subframe or a DwPTS of a special subframe or a UpPTS of a special subframe, an uplink subframe or another part of an uplink subframe except for a part corresponding to a downlink unicast control region, and a downlink subframe or another part of a downlink subframe except a unicast control region. Optionally, the first device may also configure, in a time-frequency resource included in the MBSFN subframe, a time-frequency pattern for transmitting the first sequence, and transmit the first sequence in the non-unicast region of the MBSFN subframe. Alternatively, the first device may also configure a subframe for transmitting the first sequence, as a special subframe, and transmit the first sequence within a GP of the special subframe. Alternatively, the first device may also configure an uplink subframe announced in a system broadcast message, as a downlink subframe, and transmit the first sequence in the downlink subframe. Alternatively, the first device directly transmits the first sequence on all or some REs included in a downlink subframe or another part of a downlink subframe except a unicast control region, where only the first sequence is transmitted. Alternatively, the first device directly transmits the first sequence on all or some REs included in an uplink subframe or another part of an uplink subframe except for a part corresponding to a downlink unicast control region, where only the first sequence is transmitted. In the foregoing manner, channel quality of the first sequence received by the second device can be improved, and a signal to interference plus noise ratio (SINR) of the first sequence received by the second device is relatively high, thereby ensuring that the second device implements high-precision network listening by using the first device. Optionally, in addition to transmitting the first sequence, the first device may further transmit other data in the foregoing network listening resources, which is not limited herein.

It should be noted that in a process in which the second device receives the first sequence, if a receive/transmit transition time of the second device and/or the first device needs to be considered, an OFDM symbol corresponding to the receive/transmit transition time further needs to be excluded from the network listening resource described above. Likewise, in a process in which the first device transmits the first sequence, a receive/transmit transition time of the second device and/or the first device also needs to be considered, and in this case, an OFDM symbol corresponding to the receive/transmit transition time also needs to be excluded from the network listening resource described above.

Next, possible forms of the time-frequency pattern of the base sequence in the foregoing Embodiment 1 are described in detail as follows:

In a possible implementation manner, the time-frequency pattern of the base sequence may be, for example, all or some time-frequency resources that are included in a non-unicast region of an MBSFN subframe. Specifically, referring to FIG. 3A, FIG. 3A is a schematic structural diagram of an MBSFN subframe to which a network listening method of the present invention is applicable.

Figure 3A:
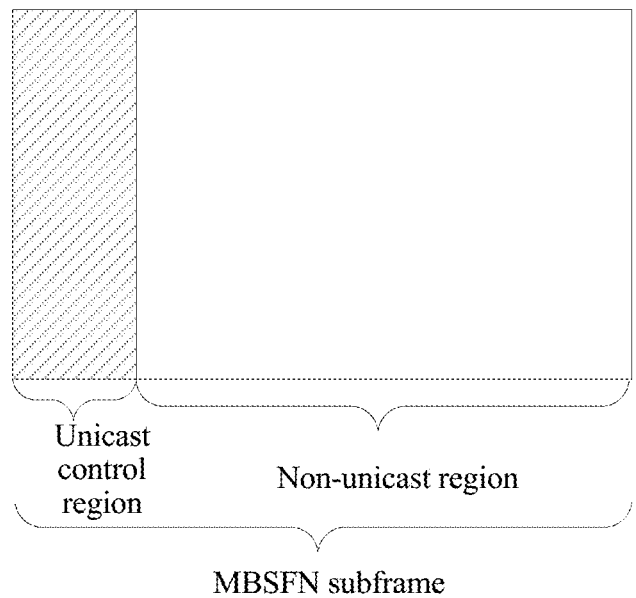
FIG. 3A is a schematic structural diagram of an MBSFN subframe to which a network listening method of the present invention is applicable.
Figure 3B:
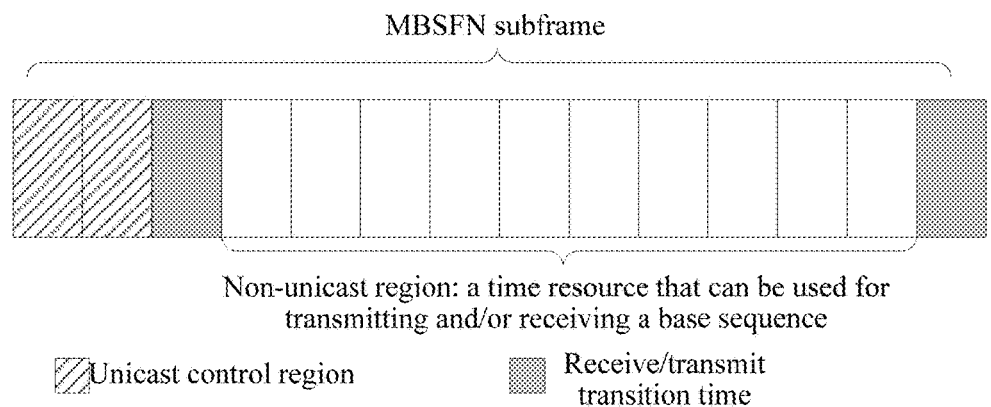
FIG. 3B is a schematic diagram of a time-frequency resource in a non-unicast region shown in FIG. 3A except two receive/transmit transition times.

As shown in FIG. 3A, the MBSFN subframe includes a slash-filled unicast control region and an unfilled non-unicast region, and the time-frequency pattern of the base sequence is all or some time-frequency resources included in the non-unicast region. For a device of an earlier release (Release), for example, for user equipment of Release 8, the unicast control region occupies one to three OFDM symbols, which may include: a PDCCH, a PHICH, a PCFICH, a cell-specific reference signal (CRS), and the like. All or some time-frequency resources included in the non-unicast region may be all REs or some REs included in the non-unicast region shown in FIG. 3A, or another time-frequency resource unit including an RE, an OFDM symbol, or a subcarrier. For example, some time-frequency resources may be all or some time-frequency resources (for example, all or some REs) in the non-unicast region except one or more receive/transmit transition times. The receive/transmit transition time refers to a transition time required when a device transits from a data transmitting state to a data receiving state, or a transition time required when a device transits from a data receiving state to a data transmitting state. Specifically, referring to FIG. 3B, FIG. 3B is a schematic diagram of a time-frequency resource in a non-unicast region shown in FIG. 3A except two receive/transmit transition times, where gray-filled regions represent time-frequency resources in which the receive/transmit times are located.

In addition, to improve resource reuse efficiency, in this embodiment, all or some time-frequency resources included in the non-unicast region may carry different base sequences. The different base sequences are base sequences with different time-frequency patterns or base sequences with different sequence forms, where the time-frequency patterns of the base sequences with different time-frequency patterns may be time-frequency shifts of each other. A quantity of different base sequences that can be carried by all or some time-frequency resources included in the non-unicast region may be indicated by using a reuse factor. For example, if the reuse factor is 1, it indicates that all or some time-frequency resources included in the non-unicast region can carry only one base sequence; if the reuse factor is 3, it indicates all or some time-frequency resources included in the non-unicast region can carry three base sequences.

In this embodiment, a sequence form of the base sequence may be related to an identifier of a device that transmits and/or receives the first sequence, or may be related to a synchronization level of a device that transmits and/or receives the first sequence, or may be related to indexes of an OFDM symbol, a timeslot, a subframe, and a radio frame in which the base sequence is located, or may be related to indexes of a subcarrier, an RE, an RB, and a PRB in which the base sequence is located. For example, according to the identifier of the device that transmits and/or receives the first sequence, and a specified pseudo-random initialization sequence, an initialization sequence that is corresponding to the identifier of the device and is used to transmit the base sequence is obtained. The specified pseudo-random initialization sequence includes: a pseudo-random initialization sequence of each OFDM symbol of an initialization sequence of a CRS and an initialization sequence of a channel state information-reference signal (CSI-RS); or a pseudo-random initialization sequence of an initialization sequence of a demodulation reference signal (DMRS); or an initialization sequence of a discovery reference signal (DRS); or an initialization sequence of a positioning reference signal (PRS). Then, by using a pseudo-random generation sequence, a pseudo-random sequence of the base sequence is generated from the obtained initialization sequence of the base sequence. Finally, according to the generated pseudo-random sequence of the base sequence, a sequence that is corresponding to the identifier of the device and is used for the base sequence is obtained, or a sequence that is corresponding to the synchronization level of the device and is used for the base sequence is obtained. More specifically, the sequence form of the base sequence may be: a primary synchronization signal (PSS), a secondary synchronization signal (SSS), a cell-specific reference signal (CRS), a CSI-RS, a PRS, an MBSFN RS, a DMRS, a discovery reference signal (DRS), or the like.

Next, the following describes in detail possible specific forms of the time-frequency pattern of the base sequence when the time-frequency pattern of the base sequence is specifically: a time-frequency resource occupied by the base sequence is all or some time-frequency resources included in a non-unicast region of the MBSFN subframe.

It should be noted that in the following description, a number of antenna ports announced on a PBCH is used only to indicate that the base sequence may have different time-frequency patterns, and the time-frequency pattern of the base sequence may also be not bond to the number of antenna ports.

Figure 4A:
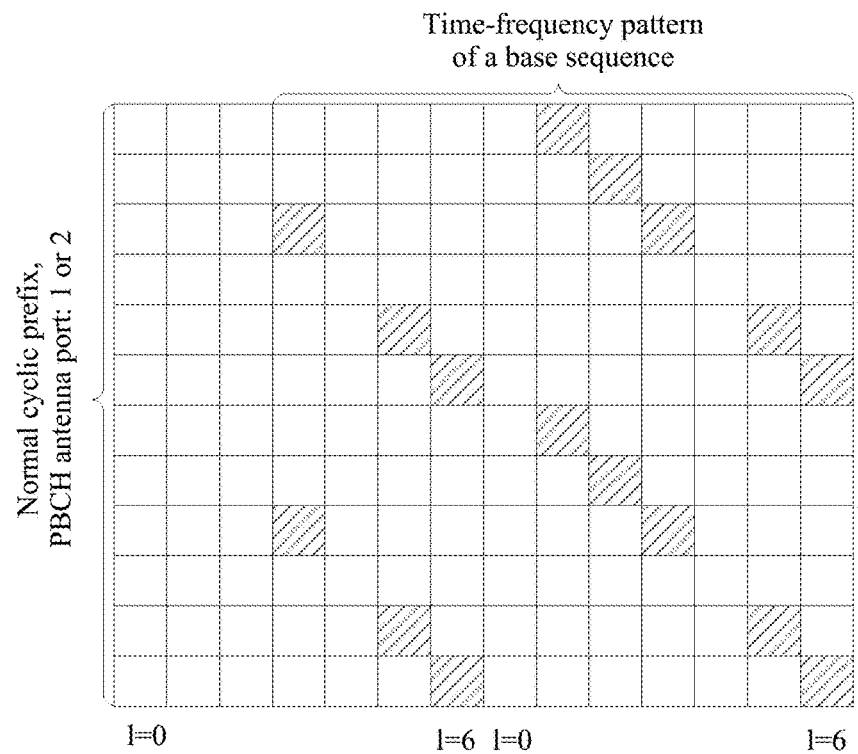
FIG. 4A is a schematic diagram of a time-frequency pattern of a base sequence when a number of antenna ports announced on a PBCH is 1 or 2 for a normal CP in a network listening method of the present invention.
Figure 4B:
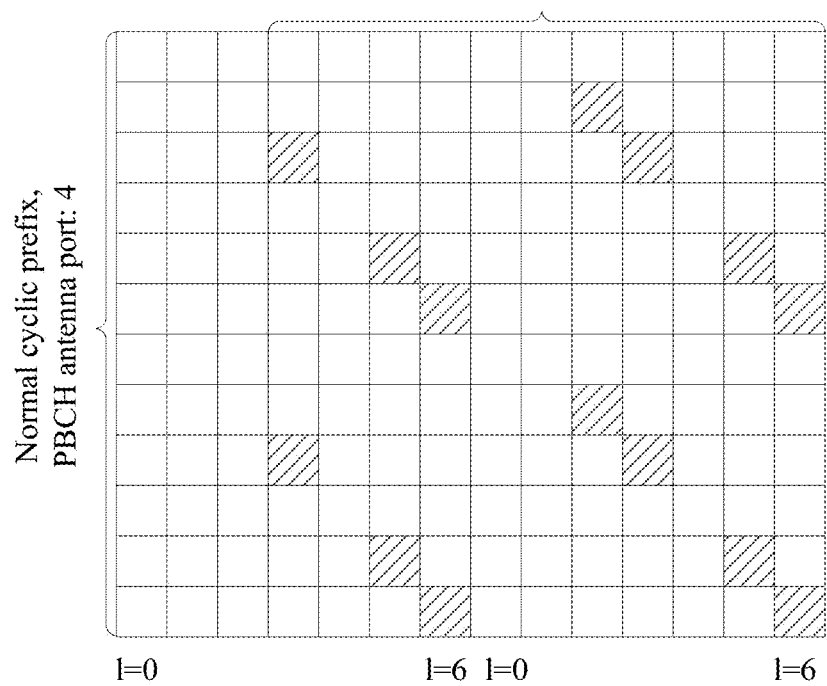
FIG. 4B is a schematic diagram of a time-frequency pattern of a base sequence when a number of antenna ports announced on a PBCH is 4 for a normal CP in a network listening method of the present invention.
Figure 4C:
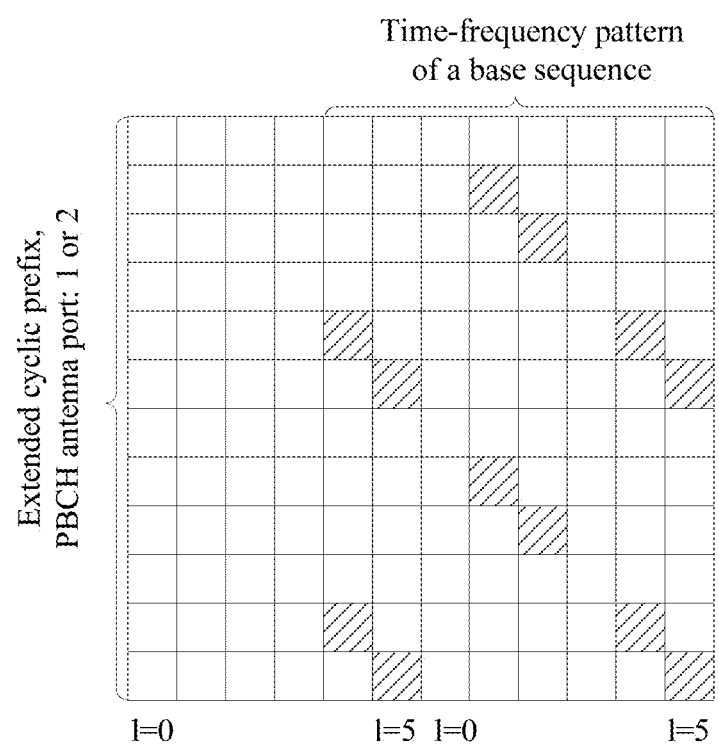
FIG. 4C is a schematic diagram of a time-frequency pattern of a base sequence when a number of antenna ports announced on a PBCH is 1 or 2 in for an extended CP in a network listening method of the present invention.
Figure 4D:
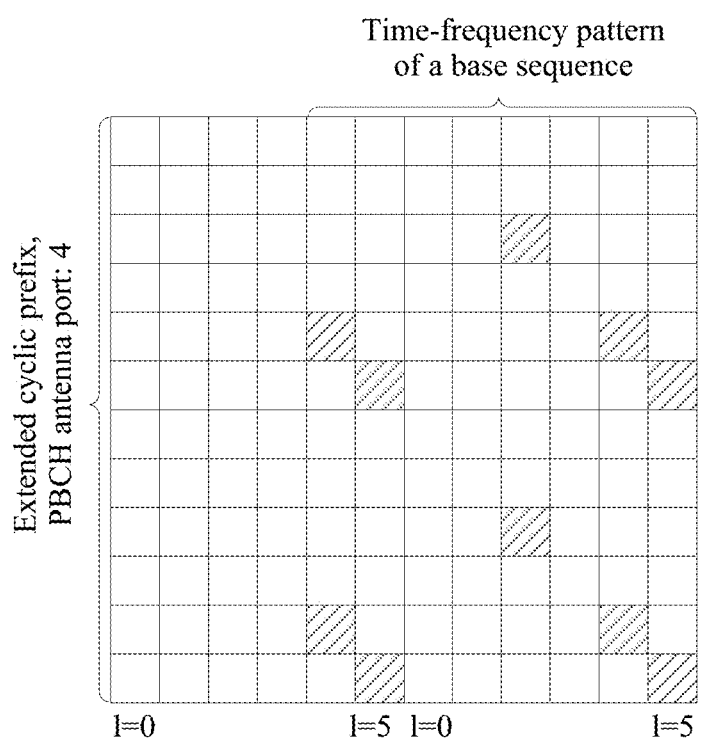
FIG. 4D is a schematic diagram of a time-frequency pattern of a base sequence when a number of antenna ports announced on a PBCH is 4 for an extended CP in a network listening method of the present invention.

Form 1:

Time-frequency patterns shown in FIG. 4A to FIG. 4D. FIG. 4A is a schematic diagram of a time-frequency pattern of a base sequence when a number of antenna ports announced on a PBCH is 1 or 2 for a normal CP in a network listening method of the present invention; FIG. 4B is a schematic diagram of a time-frequency pattern of a base sequence when a number of antenna ports announced on a PBCH is 4 for a normal CP in a network listening method of the present invention; FIG. 4C is a schematic diagram of a time-frequency pattern of a base sequence when a number of antenna ports announced on a PBCH is 1 or 2 for an extended CP in a network listening method of the present invention; FIG. 4D is a schematic diagram of a time-frequency pattern of a base sequence when a number of antenna ports announced on a PBCH is 4 for an extended CP in a network listening method of the present invention.

Specifically, within one subframe, by using an RB pair as an example, according to different types of a cyclic prefix and different quantities of antenna ports announced on a PBCH, the time-frequency pattern of the base sequence may be, for example, any one of the time-frequency patterns shown in FIG. 4A to FIG. 4D, or may be a time-frequency pattern obtained after time-frequency shifting is performed on the time-frequency pattern. As shown in FIG. 4A to FIG. 4D, a slash-filled part represents a time-frequency resource occupied by the base sequence. REs represented by the remaining blank parts may carry data or may not carry data, and may carry base sequences or may not carry base sequences. If the REs represented by the remaining blank parts carry the base sequences, forms of the carried base sequences may be the same or may be different, which is not limited herein.

Referring still to FIG. 4A to FIG. 4D, in this example, the time-frequency pattern of the base sequence may be the same as a time-frequency pattern of a PRS in an existing LTE system, or may include all or some time-frequency resources of the time-frequency pattern of the PRS in the existing LTE system, or may be obtained by means of transformation based on a time-frequency pattern of a PRS. The following describes a specific meaning of transformation in detail.

Further, in this example, within one RB pair, a frequency reuse factor of the base sequence is equal to, for example, 6, that is, one RB pair can carry six base sequences with different time-frequency patterns. Frequency reuse factors of different base sequences may be the same or different.

It should be noted that in the foregoing embodiment, an example in which the time-frequency pattern of the base sequence is a time-frequency pattern of a PRS in the existing LTE system is used to describe the present invention in detail, which, however, is not limited in the present invention. In another feasible implementation manner, the time-frequency pattern of the base sequence may be a time-frequency pattern of another reference signal in the LTE system, for example, a time-frequency pattern of a reference signal such as a PSS, an SSS, a CRS, a CSI-RS, an MBSFN reference signal (MBSFN RS), a DMRS, or a DRS.

In addition, it should further be noted that in the foregoing embodiment, an example in which the time-frequency pattern of the base sequence is a time-frequency pattern shown in FIG. 4A to FIG. 4D is used to describe the present invention, which, however, is not limited in the present invention. In another feasible implementation manner, the time-frequency pattern of the base sequence may include some segments of the time-frequency pattern shown in any one of FIG. 4A to FIG. 4D, where the some segments refer to some REs included in the time-frequency pattern shown in any one of FIG. 4A to FIG. 4D.

In addition, it should further be noted that in the foregoing embodiment, an example in which the time-frequency pattern of the base sequence is the time-frequency pattern shown in FIG. 4A to FIG. 4D is used to describe the present invention, which, however, is not limited in the present invention. Alternatively, the time-frequency pattern of the base sequence may be a time-frequency pattern obtained by performing time-frequency shifting on the time-frequency pattern shown in FIG. 4A to FIG. 4D. Further, the time-frequency pattern of the base sequence may be another time-frequency pattern including a time-frequency pattern obtained by performing time-frequency shifting on the time-frequency pattern shown in any one of FIG. 4A to FIG. 4D. Different time-frequency shifts may be corresponding to different PCIs or may be corresponding to different synchronization levels.

Specifically, time-frequency shifting refers to translation of the time-frequency pattern of the base sequence on a frequency resource and/or a time resource. In this embodiment of the present invention, the following two time-frequency shifting manners may be used to perform time-frequency shifting on the time-frequency patterns shown in FIG. 4A to FIG. 4D, so as to obtain the time-frequency pattern of the base sequence. Manner 1: a non-cyclic time-frequency shifting manner. In this manner, after translation, a part beyond a time-frequency resource in which the time-frequency pattern of the base sequence is located is discarded. Manner 2: a cyclic time-frequency shifting manner. In this manner, an RB pair is still used as an example, and it is assumed that within one RB pair, a range of an OFDM symbol index is: 0 to $2 \times N_{symb}^{DL}-1$ (OFDM symbols whose indexes are 0 to $N_{symb}^{DL}-1$ are corresponding to OFDM symbols whose indexes are 0 to $N_{symb}^{DL}-1$ in the first timeslot included in the RB pair; OFDM symbols whose indexes are $N_{symb}^{DL}$ to $2 \times N_{symb}^{DL}-1$ are corresponding to OFDM symbols whose indexes are 0 to $N_{symb}^{DL}-1$ in the second timeslot included in the RB pair), and a range of a subcarrier index is: 0 to $N_{sc}^{RB}-1$. Assuming that within the RB block, an RE is uniquely indicated by using a frequency index m and an OFDM symbol index n, where $0 \le m \le N_{sc}^{RB}-1$ and $0 \le n \le 2 \times N_{symb}^{DL}-1$, after data carried by the RE is cyclically translated, the occupied RE may be uniquely indicated by using a frequency index m' and an OFDM symbol index n' within the RB pair, where m'=(m+m1)mod M, n'=(n+n1)mod N, m1 indicates a quantity of subcarriers by which the data carried by the RE is translated on the frequency resource, M is an integer not greater than $N_{sc}^{RB}$, N is an integer not greater than $2 \times N_{symb}^{DL}$, n1 indicates a quantity of OFDM symbols by which the data carried by the RE is translated on the time resource, and mod indicates an REM operation. A cyclic time-frequency shift may also have another mathematical representation form, and the foregoing mentioned parameters may have another representation form or meaning, which is not limited herein. Specifically, reference may be made to FIG. 4E to FIG. 4H.

Figure 4E:
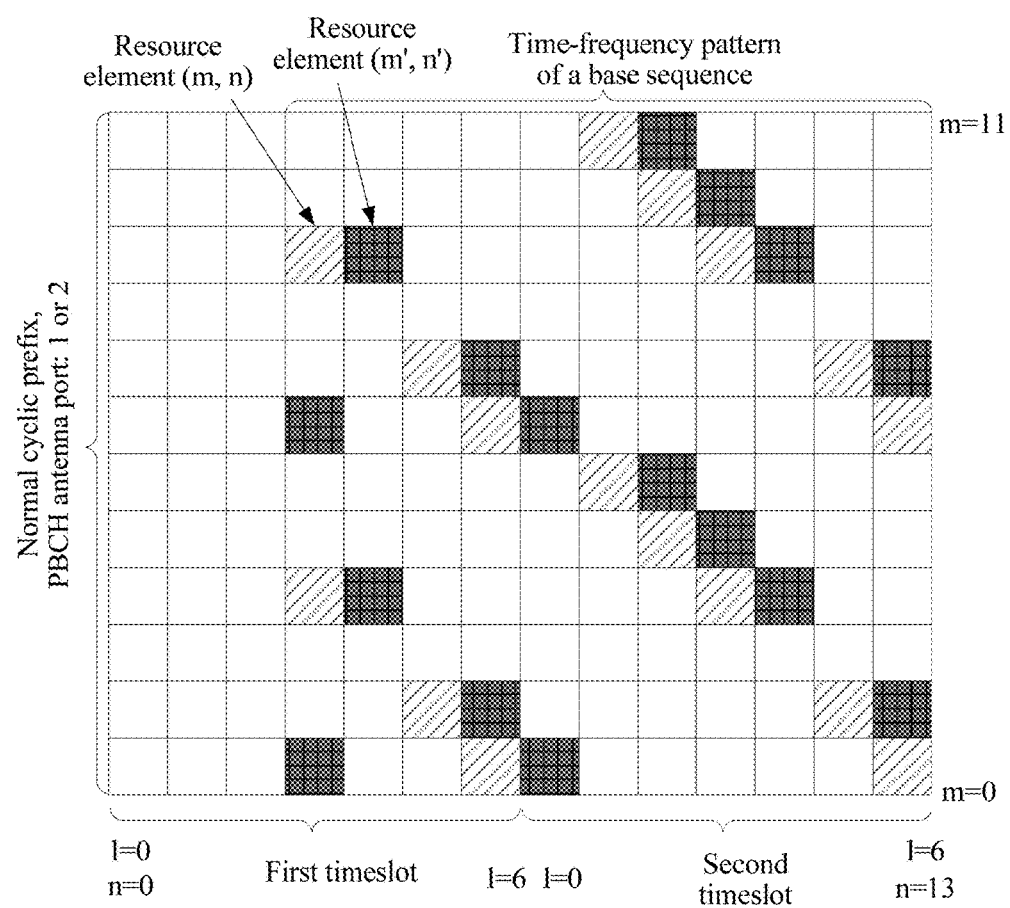
FIG. 4E is a time-frequency pattern of a base sequence obtained after the time-frequency pattern of the base sequence shown in FIG. 4A is cyclically translated by one OFDM symbol rightwards on a time resource.
Figure 4F:
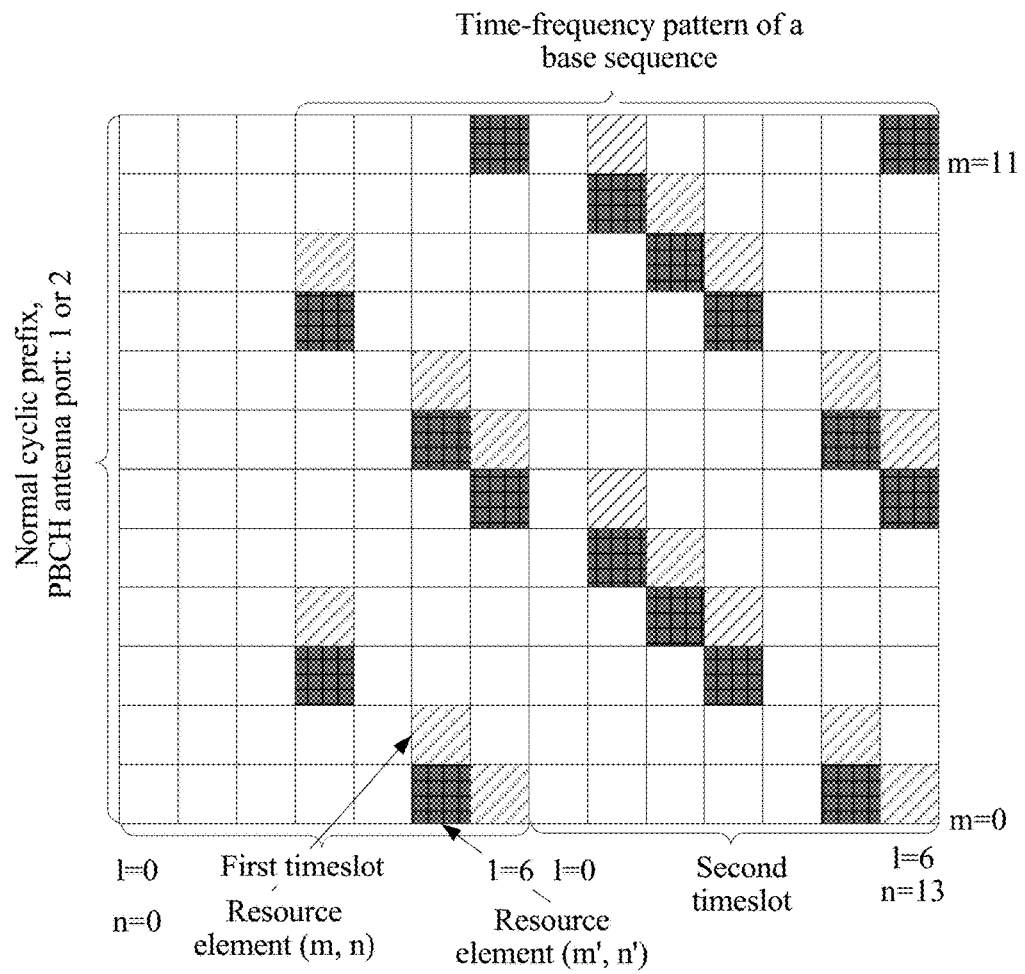
FIG. 4F is a time-frequency pattern of a base sequence obtained after the time-frequency pattern of the base sequence shown in FIG. 4A is cyclically translated by one subcarrier downwards on a frequency resource.

FIG. 4E and FIG. 4F are time-frequency patterns of base sequences obtained after cyclic time-frequency shifting is performed on the time-frequency pattern of the base sequence shown in FIG. 4A. FIG. 4E shows a time-frequency pattern of a base sequence obtained after the time-frequency pattern of the base sequence shown in FIG. 4A is cyclically translated by one OFDM symbol rightwards on a time resource, and FIG. 4F shows a time-frequency pattern of a base sequence obtained after the time-frequency pattern of the base sequence shown in FIG. 4A is cyclically translated by one subcarrier downwards on a frequency resource. Specifically, referring to FIG. 4E and FIG. 4F, in this embodiment, a value of M is 12, a value of N is 11, a value of m1 is −1, and a value of n1 is 1. A slash-filled pattern shown in each figure is the time-frequency pattern shown in FIG. 4A, and a black-grid-filled pattern is the time-frequency pattern of the base sequence obtained after cyclic time-frequency shifting is performed on the time-frequency pattern of the base sequence shown in FIG. 4A.

Figure 4G:
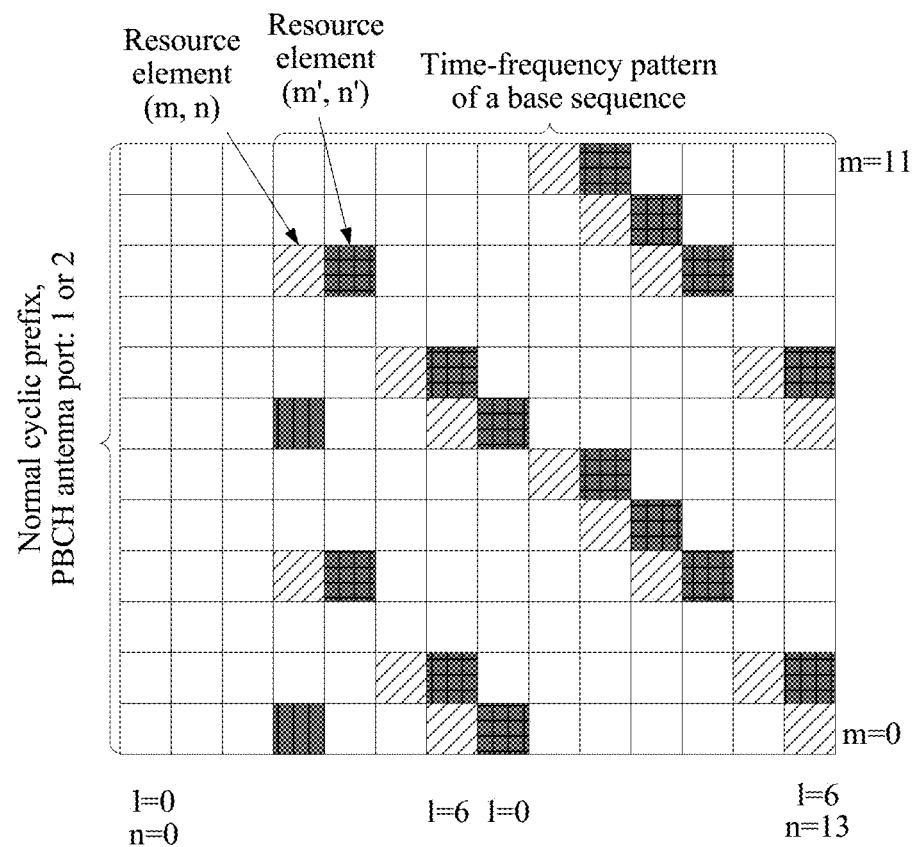
FIG. 4G is a time-frequency pattern of a base sequence obtained after the time-frequency pattern of the base sequence shown in FIG. 4A is non-cyclically translated by one OFDM symbol rightwards on a time resource.
Figure 4H:
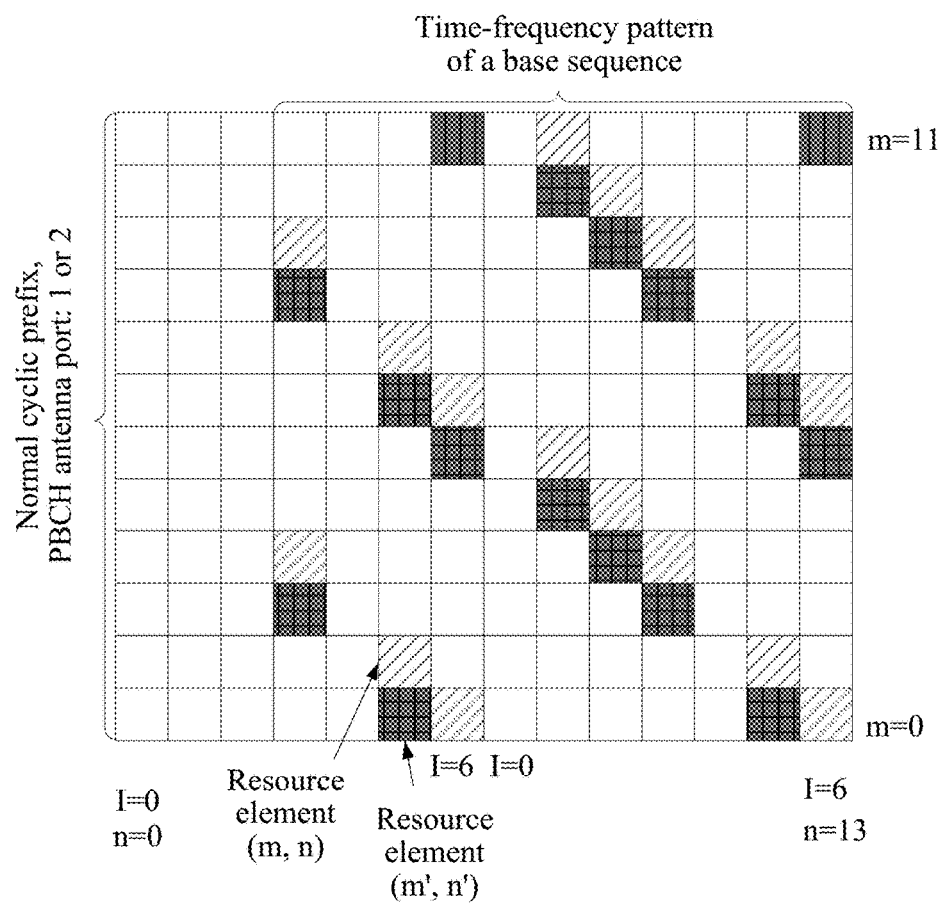
FIG. 4H is a time-frequency pattern of a base sequence obtained after the time-frequency pattern of the base sequence shown in FIG. 4A is non-cyclically translated by one subcarrier downwards on a frequency resource.

FIG. 4G and FIG. 4H are time-frequency patterns of base sequences obtained after non-cyclic time-frequency shifting is performed on the time-frequency pattern of the base sequence shown in FIG. 4A. FIG. 4G shows a time-frequency pattern of a base sequence obtained after the time-frequency pattern of the base sequence shown in FIG. 4A is non-cyclically translated by one OFDM symbol rightwards on a time resource, and FIG. 4H shows a time-frequency pattern of a base sequence obtained after the time-frequency pattern of the base sequence shown in FIG. 4A is non-cyclically translated by one subcarrier downwards on a frequency resource. Specifically, referring to FIG. 4G and FIG. 4H, in this embodiment, a value of M is 12, a value of N is 11, a value of m1 is −1, and a value of n1 is 1. A slash-filled pattern shown in each figure is the time-frequency pattern shown in FIG. 4A, a black-grid-filled pattern is the time-frequency pattern of the base sequence obtained after non-cyclic time-frequency shifting is performed on the time-frequency pattern of the base sequence shown in FIG. 4A, and a time-frequency resource filled with black vertical lines is a discarded time-frequency resource. In comparison with the foregoing FIG. 4E and FIG. 4F, in FIG. 4G and FIG. 4H, a part beyond the time-frequency resource in which the time-frequency pattern of the base sequence is located is discarded after translation. In this example, the time-frequency resource in which the time-frequency pattern of the base sequence is located may be defined as a time-frequency resource included in OFDM symbols whose indexes are 3 to 13 and in subcarriers whose indexes are 0 to 11 within a current subframe.

Form 2: Time-Frequency Patterns Shown in FIG. 5A and FIG. 5B.

Figure 5A:
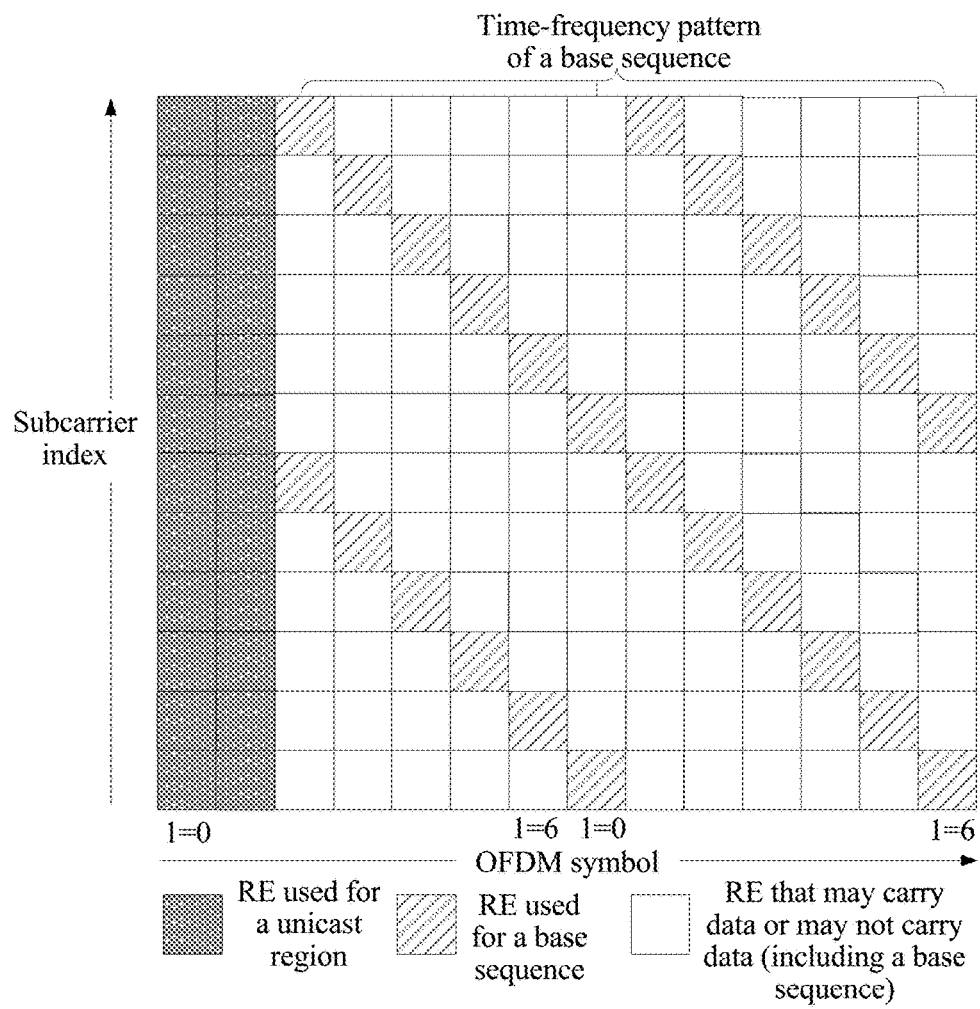
FIG. 5A is a schematic diagram of a time-frequency pattern of a base sequence when a unicast control region occupies two OFDM symbols for a normal CP in a network listening method of the present invention.
Figure 5B:
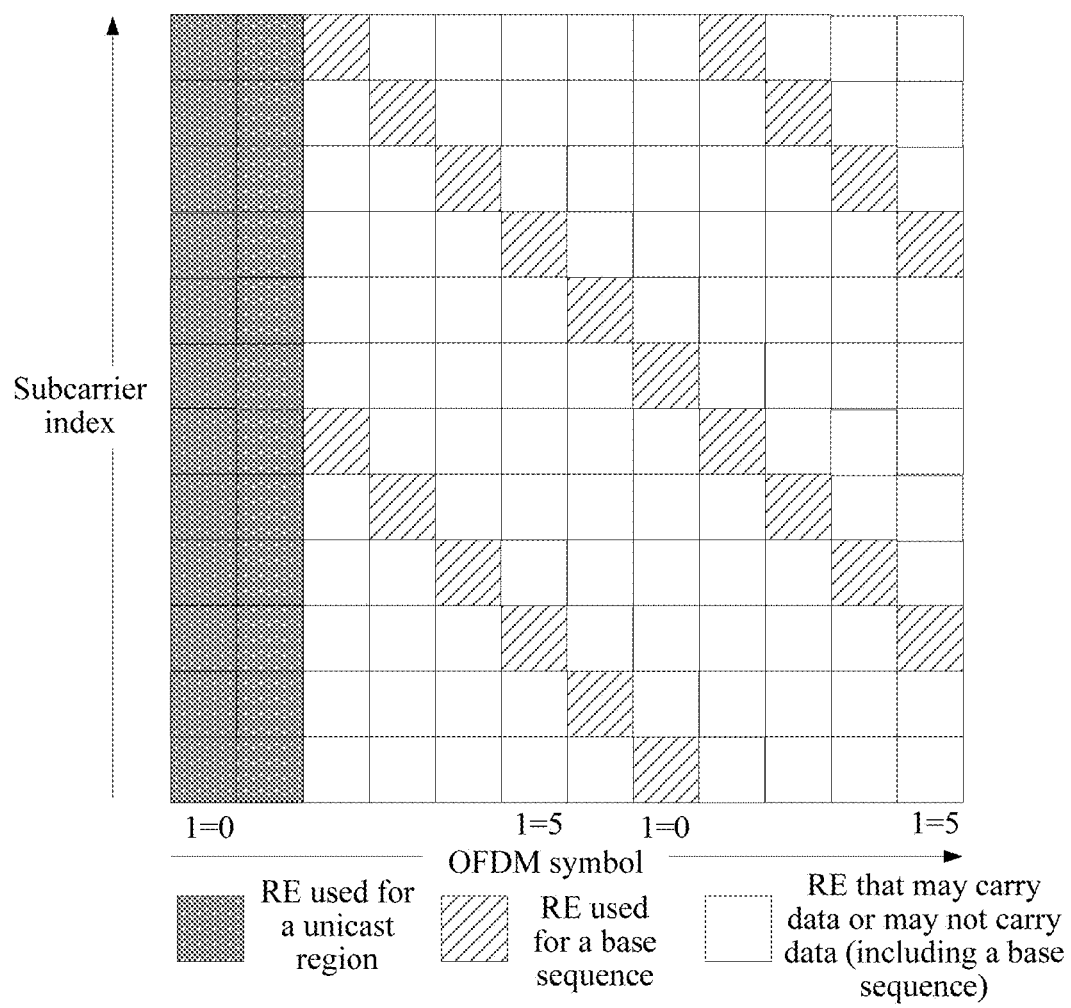
FIG. 5B is a schematic diagram of a time-frequency pattern of a base sequence when a unicast control region occupies two OFDM symbols for an extended CP in a network listening method of the present invention.

Within one subframe, by using an RB pair as an example, assuming that a unicast control region occupies two OFDM symbols, the time-frequency pattern of the base sequence may be, for example, the time-frequency patterns shown in FIG. 5A and FIG. 5B. FIG. 5A is a schematic diagram of a time-frequency pattern of a base sequence when a unicast control region occupies two OFDM symbols for a normal CP in a network listening method of the present invention, and FIG. 5B is a schematic diagram of a time-frequency pattern of a base sequence when a unicast control region occupies two OFDM symbols for an extended CP in a network listening method of the present invention.

Specifically, referring to FIG. 5A and FIG. 5B, in this embodiment, a slash-filled pattern shown in each figure is the time-frequency pattern of the base sequence (that is, a slash-filled part is a time-frequency resource in which the base sequence is located), a grid-filled pattern is a time-frequency pattern of a unicast control region (that is, a grid-filled part is a time-frequency resource in which the unicast control region is located), and a blank part is an RE that may carry or may not carry data (including a base sequence). It should be noted that in the foregoing embodiment, an example in which the time-frequency pattern of the base sequence is time-frequency patterns shown in FIG. 5A or FIG. 5B is used to describe the present invention in detail, which, however, is not limited in the present invention. In another feasible implementation manner, the time-frequency pattern of the base sequence may include some segments of the e-frequency pattern shown in either FIG. 5A or FIG. 5B, where the some segments refer to some REs included in the time-frequency pattern shown in either FIG. 5A or FIG. 5B.

Form 3: The Time-Frequency Pattern of the Base Sequence is a Combination of Time-Frequency Patterns of any Two or More Reference Signals.

Specifically, a possible combination manner is using a combination of time-frequency patterns of different reference signals as a possible form of the time-frequency pattern of the base sequence. For example, assuming that a time-frequency pattern of a PRS and a time-frequency pattern of a CRS having two antenna ports are combined as different time-frequency patterns of the base sequence, it indicates that a time-frequency pattern of a base sequence may have a time-frequency pattern of a PRS or a time-frequency pattern of a CRS. Further, within one subframe, if a reuse factor supported by the time-frequency pattern of the PRS is 6, and a reuse factor supported by the time-frequency pattern of the CRS having two antenna ports is 3, a reuse factor supported by the time-frequency pattern of the base sequence is 9.

Another possible combination manner is combining time-frequency patterns of different reference signals as a time-frequency pattern of the base sequence. For example, assuming that a pattern of a PRS and a pattern of a CRS having two antenna ports are combined as different patterns of the base sequence, it indicates that a pattern of a base sequence has both forms of a time-frequency pattern of a PRS and a time-frequency pattern of a CRS. Further, within one subframe, if a reuse factor supported by the time-frequency pattern of the PRS is 6, and a reuse factor supported by the time-frequency pattern of the CRS having two antenna ports is 3, a reuse factor supported by the time-frequency pattern of the base sequence is also 3.

Figure 6A:
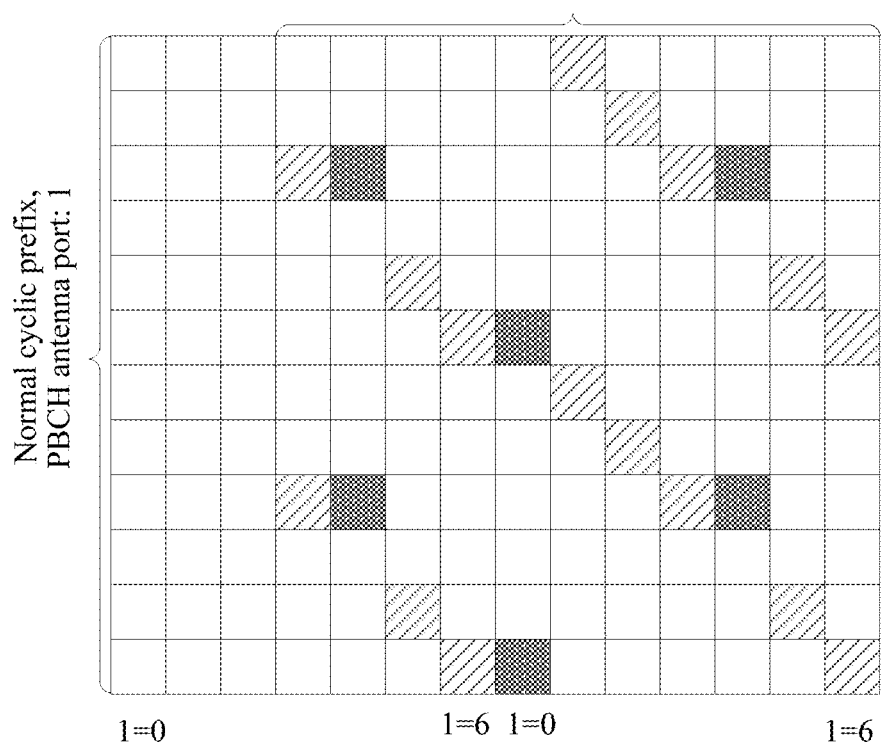
FIG. 6A is a schematic diagram of a time-frequency pattern of a base sequence that includes time-frequency patterns of a CRS and a PRS when a number of antenna ports announced on a PBCH is 1 for a normal CP in a network listening method of the present invention.
Figure 6B:
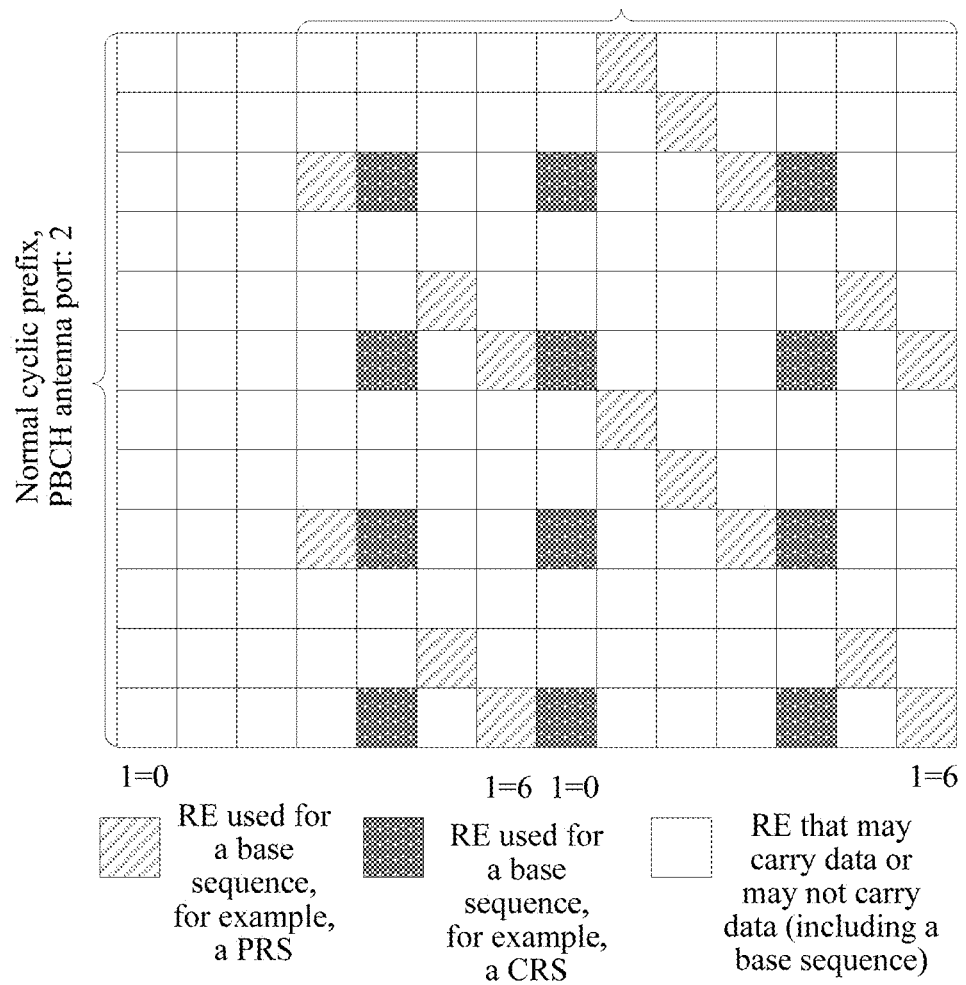
FIG. 6B is a schematic diagram of a time-frequency pattern of a base sequence that includes time-frequency patterns of a CRS and a PRS when a number of antenna ports announced on a PBCH is 2 for a normal CP in a network listening method of the present invention.
Figure 6C:
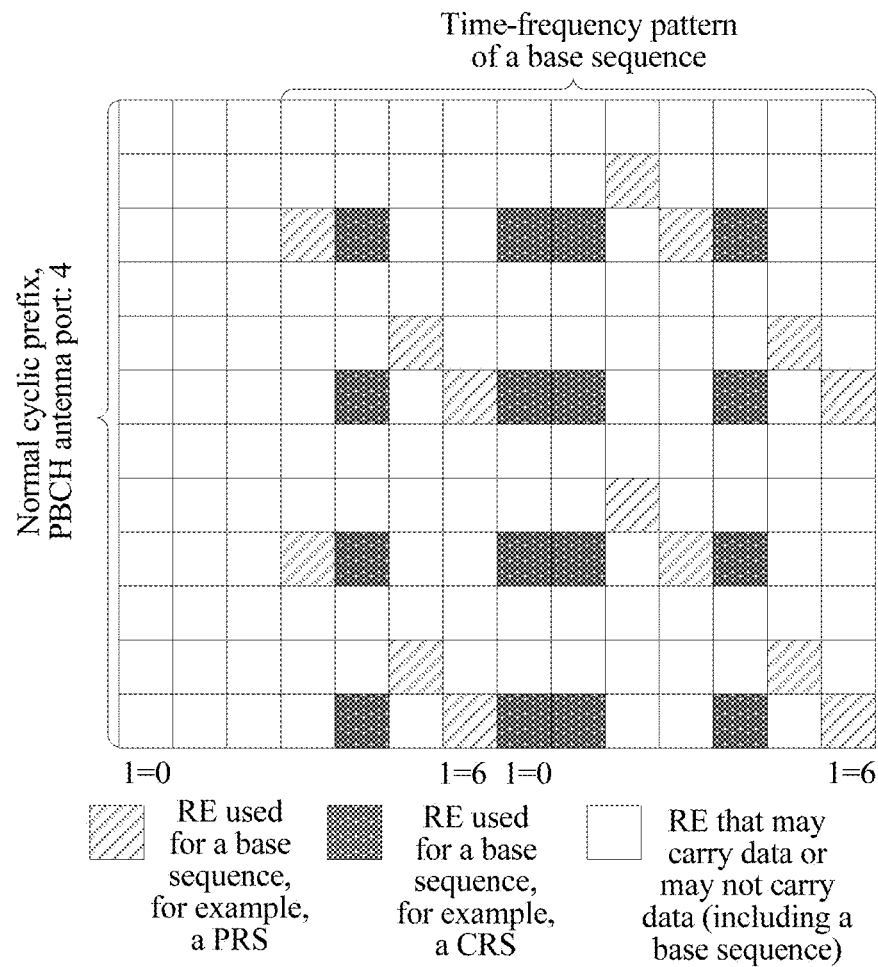
FIG. 6C is a schematic diagram of a time-frequency pattern of a base sequence that includes time-frequency patterns of a CRS and a PRS when a number of antenna ports announced on a PBCH is 4 for a normal CP in a network listening method of the present invention.
Figure 6D:
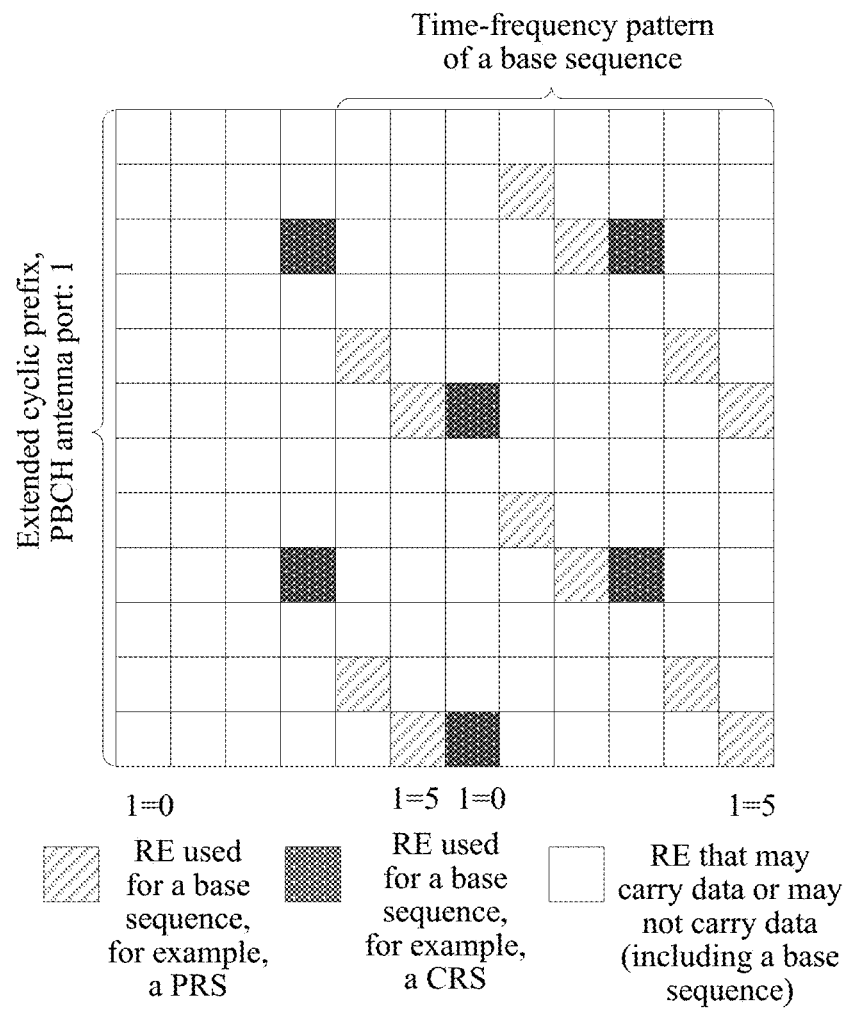
FIG. 6D is a schematic diagram of a time-frequency pattern of a base sequence that includes time-frequency patterns of a CRS and a PRS when a number of antenna ports announced on a PBCH is 1 for an extended CP in a network listening method of the present invention.
Figure 6E:
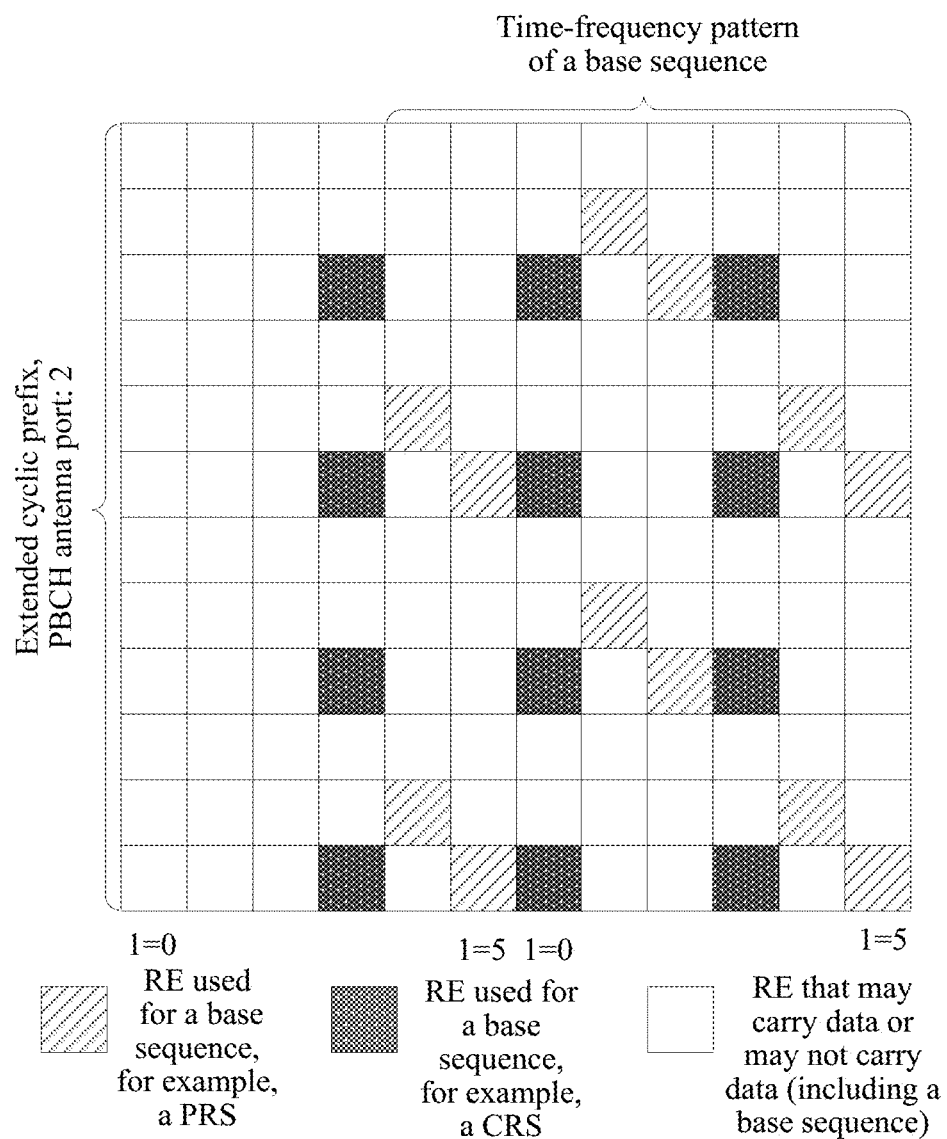
FIG. 6E is a schematic diagram of a time-frequency pattern of a base sequence that includes time-frequency patterns of a CRS and a PRS when a number of antenna ports announced on a PBCH is 2 for an extended CP in a network listening method of the present invention.
Figure 6F:
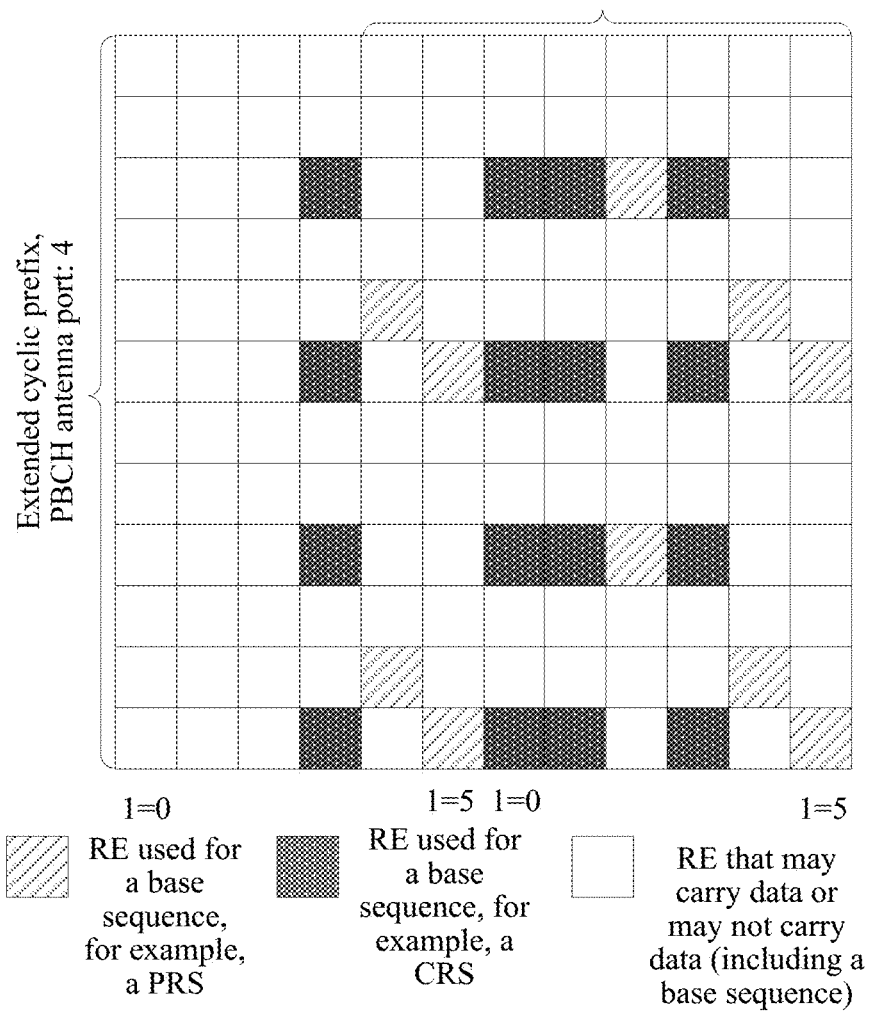
FIG. 6F is a schematic diagram of a time-frequency pattern of a base sequence that includes time-frequency patterns of a CRS and a PRS when a number of antenna ports announced on a PBCH is 4 for an extended CP in a network listening method of the present invention.

With reference to a specific embodiment, the following describes the two possible combination manner in the foregoing form 3 in detail. Specifically, reference may be made to FIG. 6A to FIG. 6F. FIG. 6A is a schematic diagram of a time-frequency pattern of a base sequence that includes time-frequency patterns of a CRS and a PRS when a number of antenna ports announced on a PBCH is 1 for a normal CP in a network listening method of the present invention. FIG. 6B is a schematic diagram of a time-frequency pattern of a base sequence that includes time-frequency patterns of a CRS and a PRS when a number of antenna ports announced on a PBCH is 2 for a normal CP in a network listening method of the present invention. FIG. 6C is a schematic diagram of a time-frequency pattern of a base sequence that includes time-frequency patterns of a CRS and a PRS when a number of antenna ports announced on a PBCH is 4 for a normal CP in a network listening method of the present invention. FIG. 6D is a schematic diagram of a time-frequency pattern of a base sequence that includes time-frequency patterns of a CRS and a PRS when a number of antenna ports announced on a PBCH is 1 for an extended CP in a network listening method of the present invention. FIG. 6E is a schematic diagram of a time-frequency pattern of a base sequence that includes time-frequency patterns of a CRS and a PRS when a number of antenna ports announced on a PBCH is 2 for an extended CP in a network listening method of the present invention. FIG. 6F is a schematic diagram of a time-frequency pattern of a base sequence that includes time-frequency patterns of a CRS and a PRS when a number of antenna ports announced on a PBCH is 4 for an extended CP in a network listening method of the present invention.

Specifically, according to different types of a cyclic prefix, different quantities of antenna ports announced on a PBCH, and the like, the time-frequency pattern of the base sequence may be any one of the time-frequency patterns shown in FIG. 6A to FIG. 6F, or may be a time-frequency pattern obtained after time-frequency shifting is performed on the time-frequency pattern. As shown in FIG. 6A to FIG. 6F, a slash-filled part indicates a time-frequency resource occupied by the PRS. A grid-filled part indicates a time-frequency resource occupied by the CRS. An RE indicated by a blank part may carry data or may not carry data, and may carry the base sequence or may not carry the base sequence. If the RE indicated by the blank part carries the base sequence, forms of the carried base sequence may be the same or may be different, which is not limited herein.

It should be noted that for the foregoing time-frequency patterns of the base sequences shown in FIG. 6A to FIG. 6F, an example in which a number of antenna ports that are announced on a PBCH and are corresponding to the time-frequency pattern of the PRS is the same as a number of antenna ports that are announced on a PBCH and are corresponding to the time-frequency pattern of the CRS is used to describe the present invention in detail, which, however, is not limited in the present invention. When a combination form is considered, a number of antenna ports that are announced on the PBCH and are corresponding to the time-frequency pattern of the PRS may be the same as or different from a number of antenna ports that are announced on the PBCH and are corresponding to the time-frequency pattern of the CRS.

In addition, it should further be noted that for the foregoing time-frequency patterns of the base sequences shown in FIG. 6A to FIG. 6F, an example in which the time-frequency pattern of the PRS and the time-frequency pattern of the CRS are directly combined as the time-frequency pattern of the base sequence or a possible form of the time-frequency pattern of the base sequence is used to describe the present invention in detail, which, however, is not limited in the present invention. In another feasible implementation manner, time-frequency shifting may be performed on the time-frequency pattern of the PRS or the CRS, and a time-frequency pattern of the PRS or the CRS after time-frequency shifting is combined as the time-frequency pattern of the base sequence or a possible form of the time-frequency pattern of the base sequence.

In addition, it should further be noted that for the foregoing time-frequency patterns of the base sequences shown in FIG. 6A to FIG. 6F, an example in which the time-frequency pattern of the PRS and the time-frequency pattern of the CRS are combined as the time-frequency pattern of the base sequence or a possible form of the time-frequency pattern of the base sequence is used to describe the present invention in detail, which, however, is not limited in the present invention. In another feasible implementation manner, time-frequency patterns of sequences of any two or more of a PSS, an SSS, an MBSFN RS, a CSI-RS, a DRS, a CRS, a PRS, and the like are combined as the time-frequency pattern of the base sequence.

The time-frequency patterns of the base sequences described in the foregoing FIG. 4A to FIG. 4H, FIG. 5A and FIG. 5B, and FIG. 6A to FIG. 6F may be considered as a time-frequency pattern of a base sequence on one antenna port. When multiple antenna ports are considered, time-frequency patterns of base sequences on different antenna ports are the same or different. In this case, if the time-frequency pattern of the base sequence is obtained by combining reference signals supported by the LTE system, for example, when the time-frequency patterns of the base sequences shown in FIG. 6A to FIG. 6F are obtained by combining the pattern corresponding to the PRS and the pattern corresponding to the CRS, a time-frequency pattern that is of a base sequence and is corresponding to different antenna ports may be a combination of the time-frequency pattern corresponding to the PRS and patterns of a CRS corresponding to different antenna ports. Specifically, reference may be made to FIG. 7A and FIG. 7B.

Figure 7A:
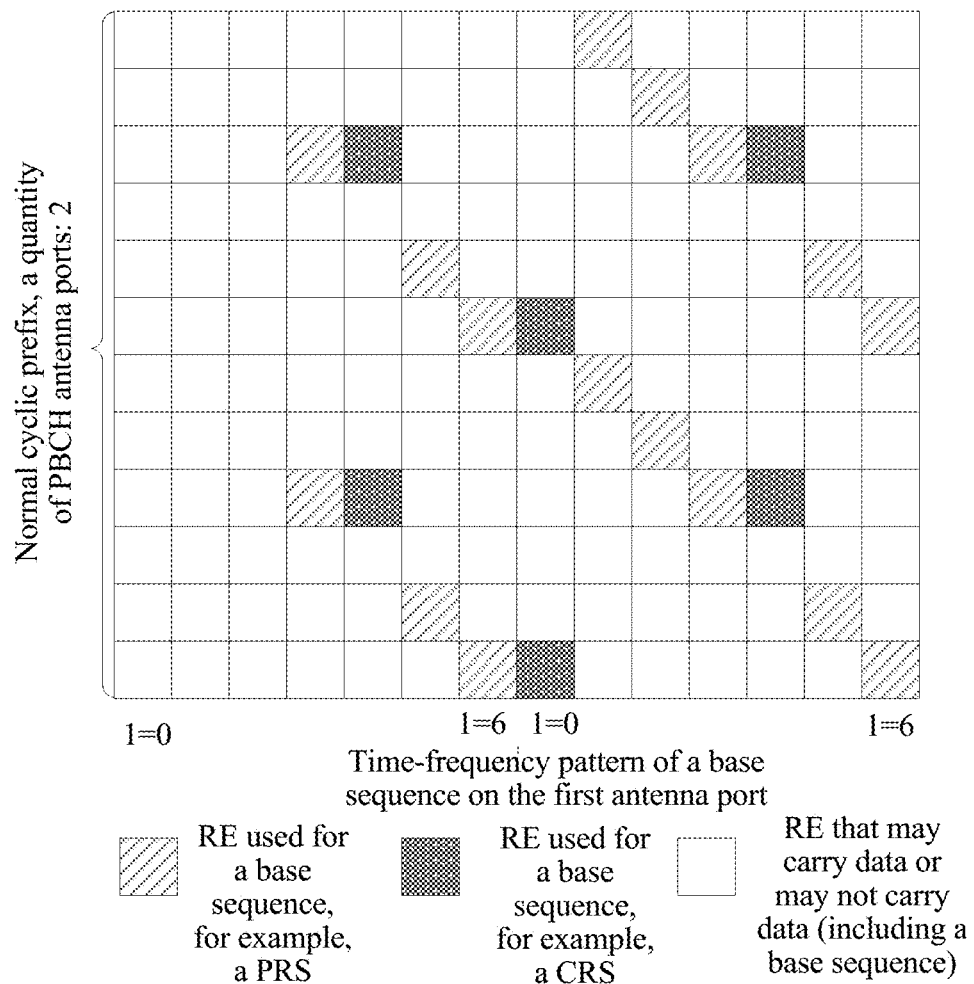
FIG. 7A is a schematic diagram of a time-frequency pattern of a base sequence on a first antenna port when a number of antenna ports announced on a PBCH is 2 for a normal CP in a network listening method of the present invention.
Figure 7B:
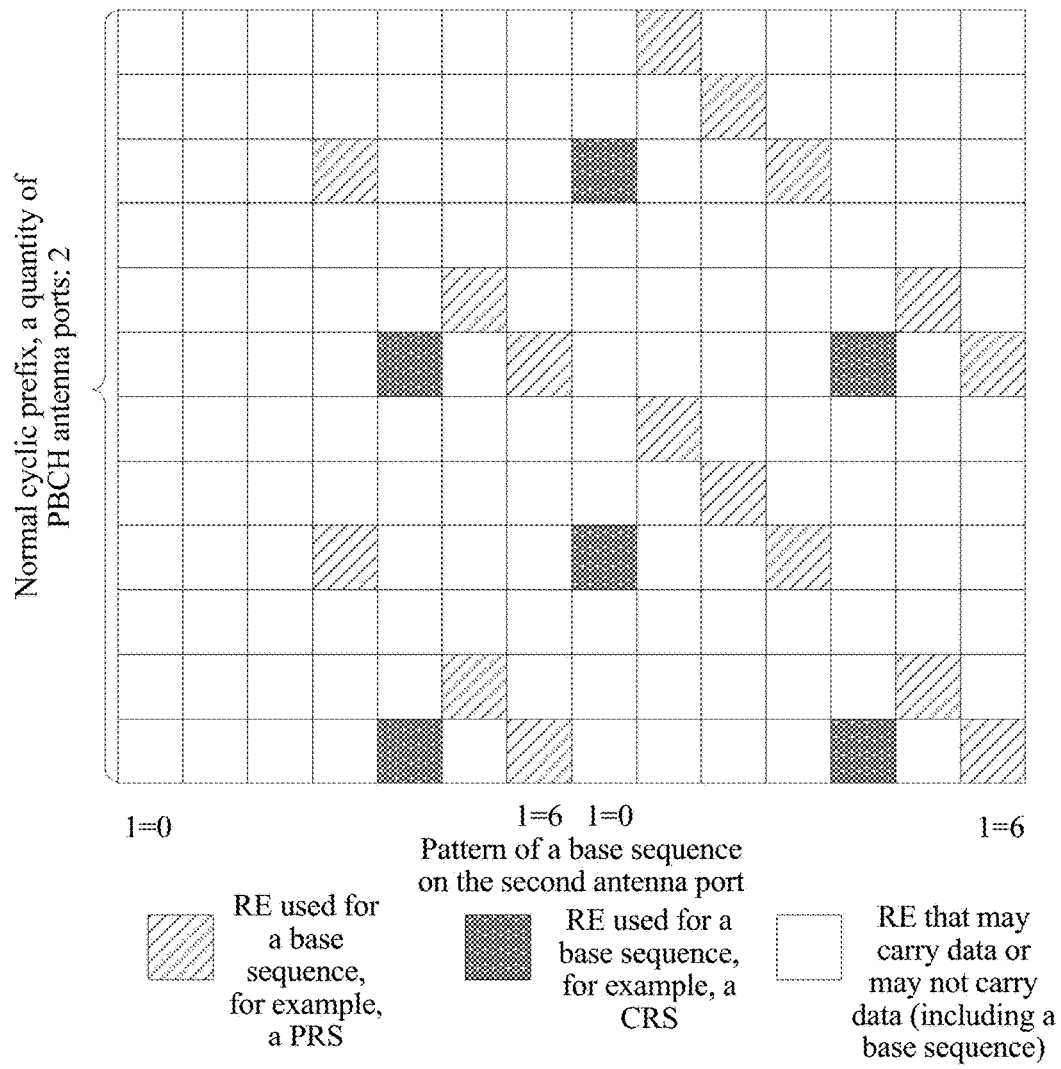
FIG. 7B is a schematic diagram of a time-frequency pattern of a base sequence on a second antenna port when a number of antenna ports announced on a PBCH is 2 for a normal CP in a network listening method of the present invention.

FIG. 7A is a schematic diagram of a time-frequency pattern of a base sequence on a first antenna port when a number of antenna ports announced on a PBCH is 2 for a normal CP in a network listening method of the present invention. FIG. 7B is a schematic diagram of a time-frequency pattern of a base sequence on a second antenna port when a number of antenna ports announced on a PBCH is 2 for a normal CP in a network listening method of the present invention. Referring to FIG. 7A, in this embodiment, a time-frequency pattern that is of a base sequence and is corresponding to an antenna port may be a combination of a time-frequency pattern of a PRS and a time-frequency pattern that is of a CRS and is corresponding to the first antenna port (for example, an antenna port 0). Referring to FIG. 7B, in this embodiment, a time-frequency pattern that is of a base sequence and is corresponding to the other antenna port may be a combination of a pattern of a PRS and a time-frequency pattern that is of a CRS and is corresponding to the second antenna port (for example, an antenna port 1). Alternatively, a time-frequency pattern that is of a base sequence and is corresponding to an antenna port may be a time-frequency pattern of a PRS, and a time-frequency pattern corresponding to the other antenna port is a pattern of a CRS, and the like.

In another possible implementation manner, the time-frequency pattern of the base sequence may be, for example, all or some time-frequency resources included in a GP included in a special subframe. Specifically, referring to FIG. 8A, FIG. 8A is a schematic structural diagram of a special subframe to which a network listening method of the present invention is applicable.

Figure 8A:
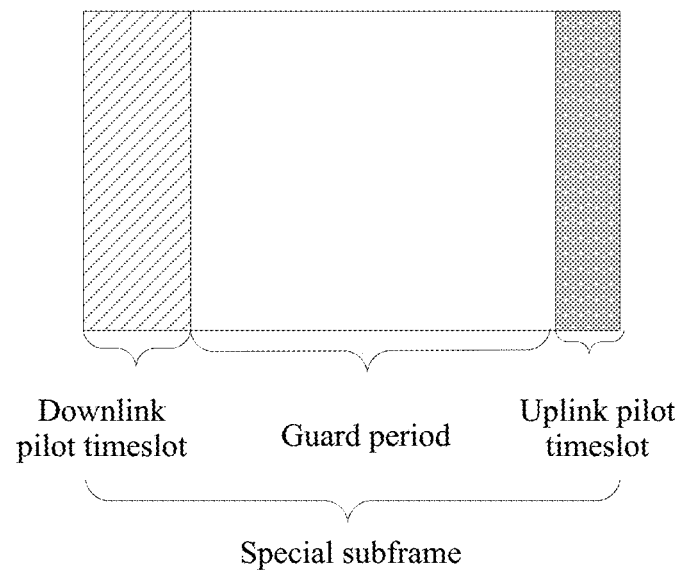
FIG. 8A is a schematic structural diagram of a special subframe to which a network listening method of the present invention is applicable.

As shown in FIG. 8A, all or some time-frequency resources included in the GP of the special subframe refer to all or some REs included in the GP, or another time-frequency resource unit including an RE, an OFDM symbol, or a subcarrier. Some time-frequency resources may be, for example, other time-frequency resources in the GP of the special subframe than one or more receive/transmit transition times. Specifically, referring to FIG. 8B, FIG. 8B is a schematic diagram of a time-frequency resource in a GP shown in FIG. 8A except two receive/transmit transition times.

Figure 8B:
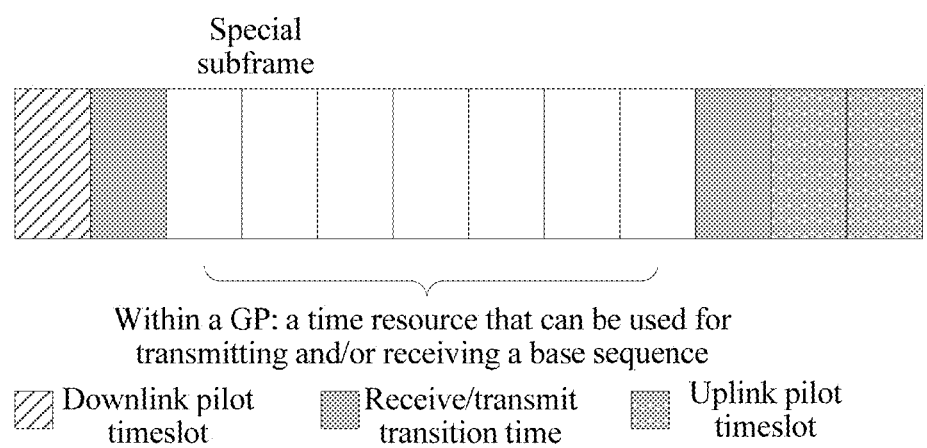
FIG. 8B is a schematic diagram of a time-frequency resource in a GP shown in FIG. 8A except two receive/transmit transition times.

Referring to FIG. 8B, a slash-filled part is a time-frequency resource occupied by a downlink pilot timeslot (DwPTS) of the special subframe, a gray-filled region represents a time-frequency resource in which a receive/transmit transition time is located, and a grid-filled region is a time-frequency resource occupied by an uplink pilot timeslot (UpPTS). Assuming that a ratio of time-frequency resources used by the DwPTS, the GP, and the UpPTS is DwPTS:GP:UpPTS=3:9:2, when the two receive/transmit transition times are excluded, the time-frequency pattern of the base sequence is located in a time-frequency resource represented by an unfilled part.

It should be noted that, similar to that the time-frequency pattern of the base sequence is located in all or some time-frequency resources included in a non-unicast region of an MBSFN subframe (that is, the time-frequency resource occupied by the base sequence is located in all or some time-frequency resources included in a non-unicast region of an MBSFN subframe), the time-frequency pattern of the base sequence may be or include all or some time-frequency patterns of a reference signal supported by the LTE system, or may be or include all or some corresponding time-frequency patterns obtained after time-frequency shifting is performed on a time-frequency pattern of a reference signal supported by the LTE system, or may be or include a combination of all or some time-frequency patterns of a reference signal supported by the LTE system, where in the process of combination, time-frequency shifting of all or some time-frequency patterns of the reference signal may also be considered.

In addition, it should further be noted that, similarly, to improve resource reuse efficiency, all or some time-frequency resources included in a guard period (GP) may carry different base sequences, where the different base sequences refer to base sequences with different time-frequency patterns or sequence forms.

In still another possible implementation manner, the time-frequency pattern of the base sequence may be, for example, all or some time-frequency resources of a downlink subframe or an uplink subframe, where the uplink subframe is announced in a system broadcast message. The some time-frequency resources may include all or some time-frequency resources of the downlink subframe or the uplink subframe except one or more receive/transmit transition times, and/or all or some time-frequency resources except a unicast control region, where the downlink subframe described herein may be a normal downlink subframe, or may be an MBSFN subframe.

Figure 9A:
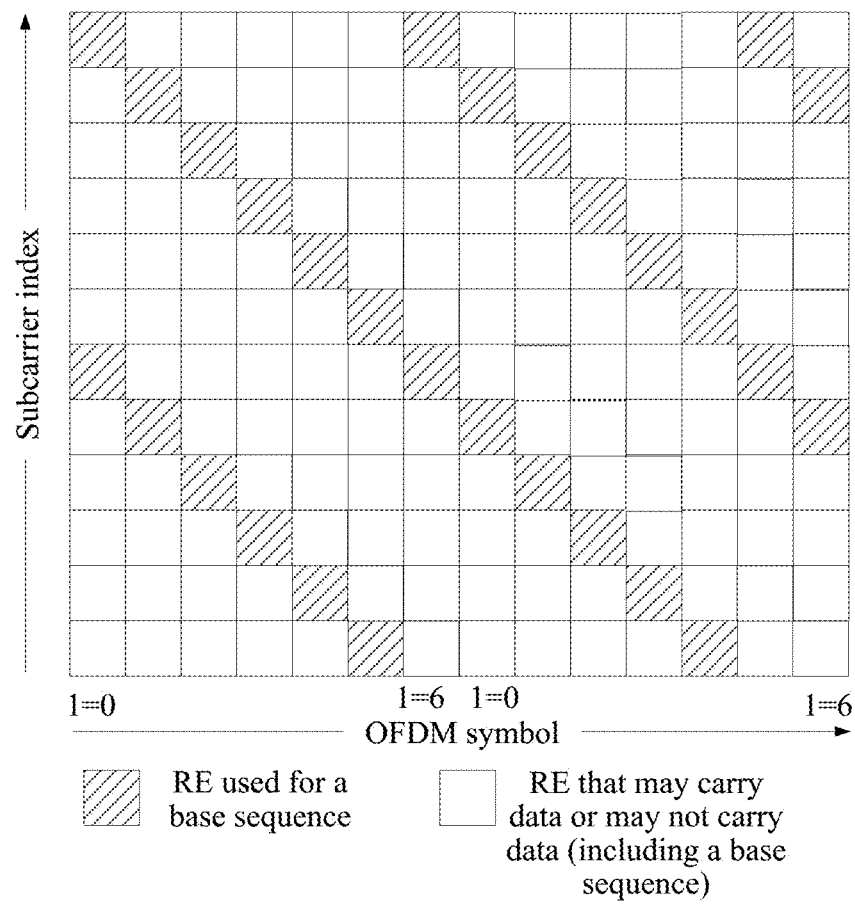
FIG. 9A is a schematic diagram of a time-frequency pattern of a base sequence that includes a time-frequency pattern of a PRS for a normal CP in a network listening method of the present invention.
Figure 9B:
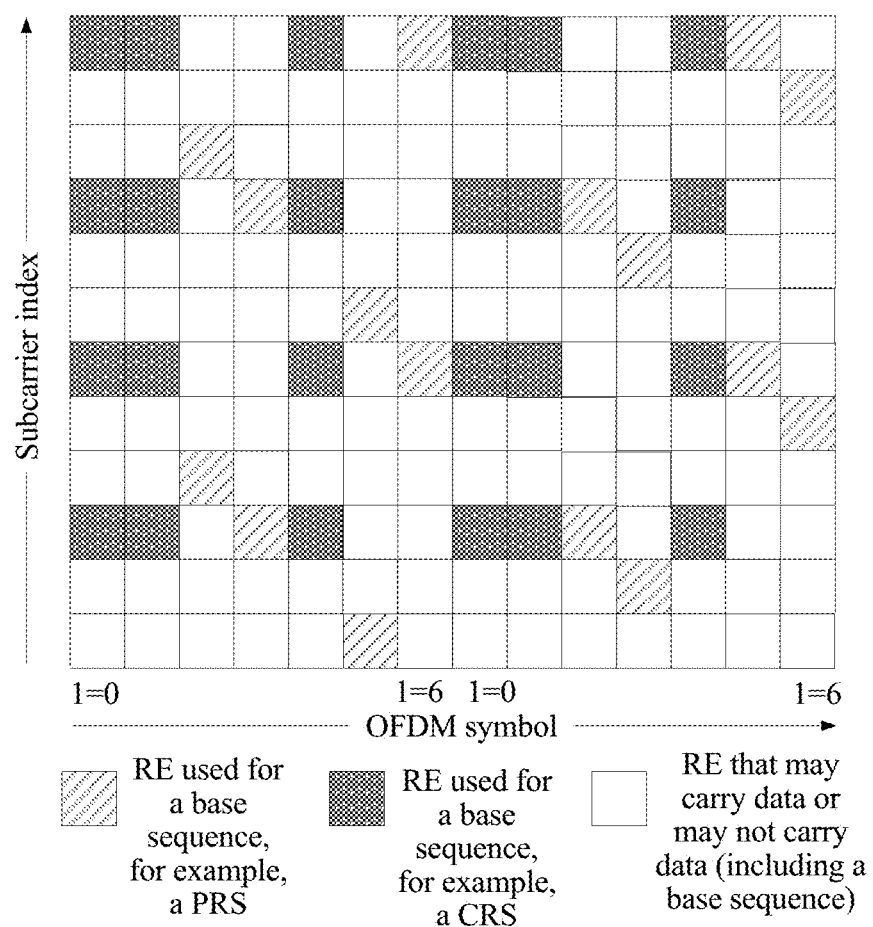
FIG. 9B is a schematic diagram of a time-frequency pattern of a base sequence that includes time-frequency patterns of a PRS and a CRS for a normal CP in a network listening method of the present invention.

In this embodiment, for a relationship between a time-frequency pattern of a base sequence and a reference signal, a reuse factor, and the like, reference may be made to the foregoing description, and details are not described herein again. The following describes several typical forms of a time-frequency pattern of a base sequence by using a time-frequency resource of a subframe (an uplink subframe or a downlink subframe) as an example. Specifically, reference may be made to FIG. 9A and FIG. 9B. FIG. 9A is a schematic diagram of a time-frequency pattern of a base sequence that includes a time-frequency pattern of a PRS for a normal CP in a network listening method of the present invention. FIG. 9B is a schematic diagram of a time-frequency pattern of a base sequence that includes time-frequency patterns of a PRS and a CRS for a normal CP in a network listening method of the present invention.

As shown in FIG. 9A, an RB pair is still used as an example, and the time-frequency pattern of the base sequence may include, for example, only a time-frequency pattern of a PRS; while in FIG. 9B, an RB pair is still used as an example, and the time-frequency pattern of the base sequence may be, for example, a combination of time-frequency patterns of a PRS and a CRS.

Optionally, in the foregoing Embodiment 1, for a network listening resource of a specific type, the first device may determine, in the following several manners, a time-frequency pattern that is of the first sequence and is corresponding to the network listening resource of this type.

Manner 1: The first device transforms the time-frequency pattern of the base sequence according to the type of the network listening resource, to determine the time-frequency pattern of the first sequence.

In this manner, the first device transforms the time-frequency pattern of the base sequence according to the type of the network listening resource, so as to obtain the time-frequency pattern of the first sequence.

Manner 2: The first device determines the time-frequency pattern of the first sequence according to a correspondence between the type of the network listening resource and the time-frequency pattern of the first sequence.

In this manner, the first device may prestore the correspondence between the type of the network listening resource and the time-frequency pattern of the first sequence and a time-frequency pattern obtained by transforming the time-frequency pattern of the base sequence. In this case, the first device searches the correspondence for a time-frequency pattern that is of a first sequence and is corresponding to a network listening resource of a related type, and then determines the time-frequency pattern of the first sequence from the time-frequency pattern obtained by transforming the time-frequency pattern of the base sequence.

Manner 3: The first device determines, according to a correspondence between the type of the network listening resource and a transformation manner of the time-frequency pattern of the base sequence, a transformation manner that is of the time-frequency pattern of the base sequence and is corresponding to the type of the network listening resource, so as to transform the time-frequency pattern of the base sequence to obtain the time-frequency pattern of the first sequence.

Specifically, the first device may prestore the correspondence between the type of the network listening resource and the transformation manner of the time-frequency pattern of the base sequence. In this case, the first device searches the correspondence for a transformation manner that is of the time-frequency pattern of the base sequence and is corresponding to a network listening resource of a related type, and then transforms the time-frequency pattern of the base sequence according to the found transformation manner to obtain the time-frequency pattern of the first sequence.

Optionally, in the foregoing various generation manners of the time-frequency pattern of the first sequence, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

Specifically, an example in which the types of the network listening resources are specifically an MBSFN subframe and a GP of a special subframe is used, where the time-frequency patterns of the first sequences respectively corresponding to the network listening resources of the two types may be obtained, for example, by transforming time-frequency patterns of a same base sequence. In addition, the time-frequency patterns of the first sequences corresponding to the network listening resources of the two types are the same or different.

Optionally, in the foregoing Embodiment 1, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource. Transforming the time-frequency pattern of the base sequence may be executed by the first device or another network element, which is not limited in the present invention. Next, various transformation manners are described in detail as follows:

A first transformation manner is directly using the time-frequency pattern of the base sequence as the time-frequency pattern of the first sequence.

In this manner, the base sequence is directly transmitted as the first sequence. In this case, the time-frequency pattern of the first sequence determined by the first device according to the type of network listening resource is the same as a time-frequency pattern of a base sequence, and a sequence form of the first sequence and a sequence form of the base sequence may be the same or may be different.

Applicable scenarios for this transformation manner of directly using the time-frequency pattern of the base sequence as the time-frequency pattern of the first sequence include: a scenario in which a time-frequency pattern of a first sequence that is actually transmitted by the first device may include the time-frequency pattern of the base sequence, or a scenario in which a time-frequency pattern of a first sequence that is actually received by the second device includes the time-frequency pattern of the base sequence. For example, assuming that the time-frequency pattern that is of the base sequence and is corresponding to the first sequence transmitted by the first device and/or received by the second device is all or some time-frequency resources included in a GP of a special subframe, when the first device or the second device or both transmit the first sequence and/or receive the first sequence by using a non-unicast region of an MBSFN subframe, a GP of a special subframe, or an uplink subframe or a downlink subframe of a system broadcast message, the time-frequency pattern of the base sequence may be directly used as the time-frequency pattern of the first sequence. In this embodiment of the present invention, the time-frequency pattern of the first sequence may be a time-frequency resource in which the first sequence is located.

A second transformation manner is puncturing the time-frequency pattern of the base sequence, and using the punctured time-frequency pattern as the time-frequency pattern of the first sequence.

In this manner, some segments of the time-frequency pattern of the base sequence are punctured adaptively, and the punctured time-frequency pattern is used as the time-frequency pattern of the first sequence. For example, for a specific time-frequency pattern of a base sequence, an RE occupied by a channel or data whose priority is higher than that of the first sequence may be punctured, and the punctured time-frequency pattern is used as the time-frequency pattern of the first sequence. The channel or data whose priority is higher than that of the first sequence includes a PBCH, a primary synchronization channel (P-SCH), a secondary synchronization channel (S-SCH), and a unicast control channel such as a PDCCH, a PCFICH, or a PHICH. When the base sequence does not include a CRS, data whose priority is higher than that of the first sequence may further include a CRS.

A third transformation manner is truncating the time-frequency pattern of the base sequence, and using the truncated time-frequency pattern as the time-frequency pattern of the first sequence.

In this transformation manner, a corresponding segment of the base sequence is adaptively truncated and used as the first sequence. In this case, the time-frequency pattern of the first sequence is a part of the time-frequency pattern of the base sequence, and the sequence form of the first sequence and the sequence form of the base sequence may be the same or may be different.

A typical application scenario for this transformation manner includes: when a time-frequency resource that is actually used to transmit the first sequence and/or receive the first sequence can include only a part of the time-frequency pattern of the base sequence, a part of the time-frequency pattern of the base sequence may be truncated and used as the time-frequency pattern of the first sequence. For example, assuming that the time-frequency resource that is of the base sequence and is corresponding to the first sequence transmitted by the first device and/or received by the second device is all or some time-frequency resources included in a non-unicast region of an MBSFN subframe, when the first device or the second device or both transmit and/or receive the first sequence by using a GP of a special subframe, truncating may be performed on the time-frequency pattern of the base sequence according to an actual time-frequency resource that may be used by the first device for transmission in the GP of the special subframe. Specifically, referring to FIG. 10A, FIG. 10A is a schematic diagram of truncating a time-frequency pattern of a base sequence in a network listening method of the present invention.

Figure 10A:
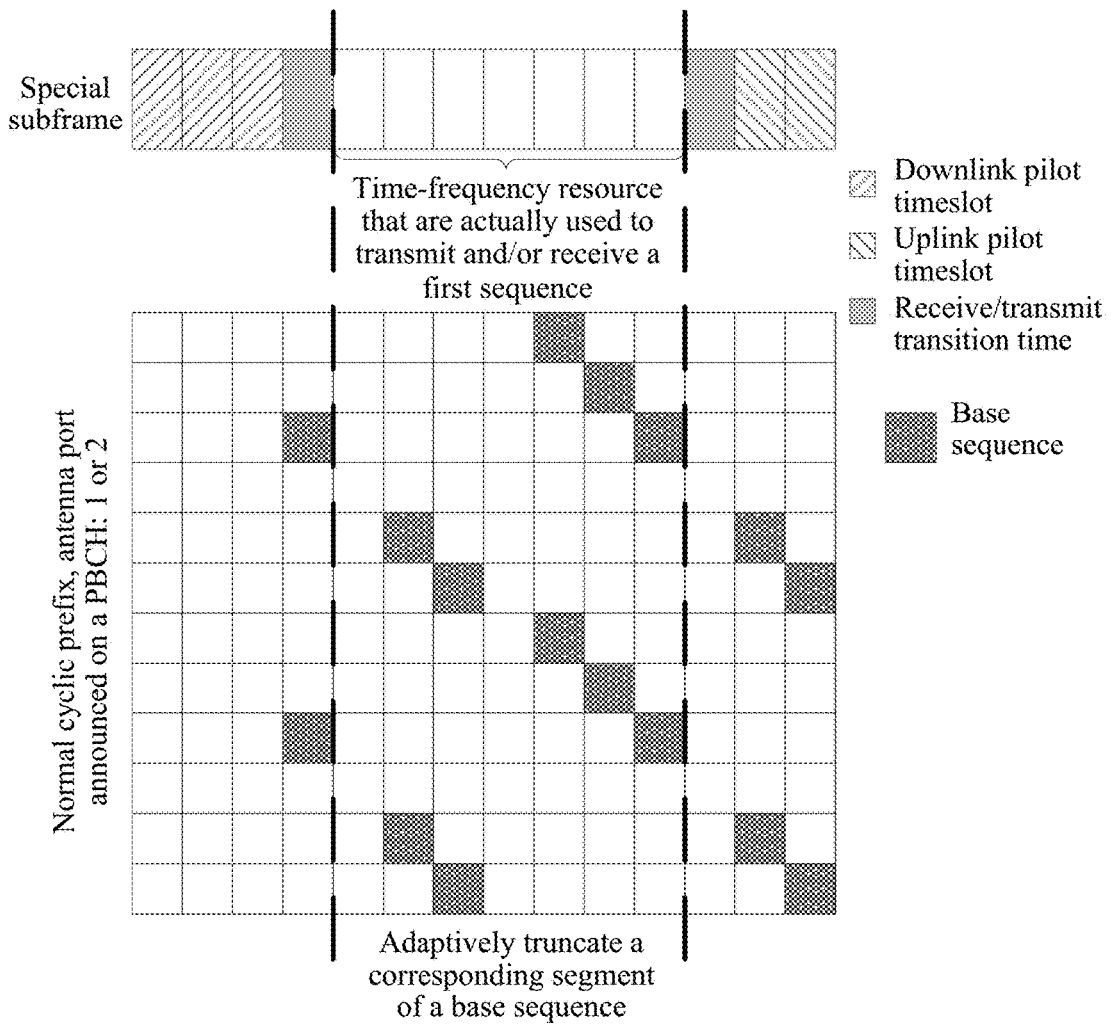
FIG. 10A is a schematic diagram of truncating a time-frequency pattern of a base sequence in a network listening method of the present invention.

Referring to FIG. 10A, assuming that the time-frequency pattern of the base sequence is represented by a grid-filled part, when the third transformation manner is used, the time-frequency pattern of the base sequence may be adaptively truncated according to the time-frequency resource that is actually used to transmit and/or receive the first sequence in the GP of the special subframe, the time-frequency pattern of the first sequence obtained after truncating is a time-frequency pattern between two black bold dashed lines in an RB pair in the figure.

Figure 10B:
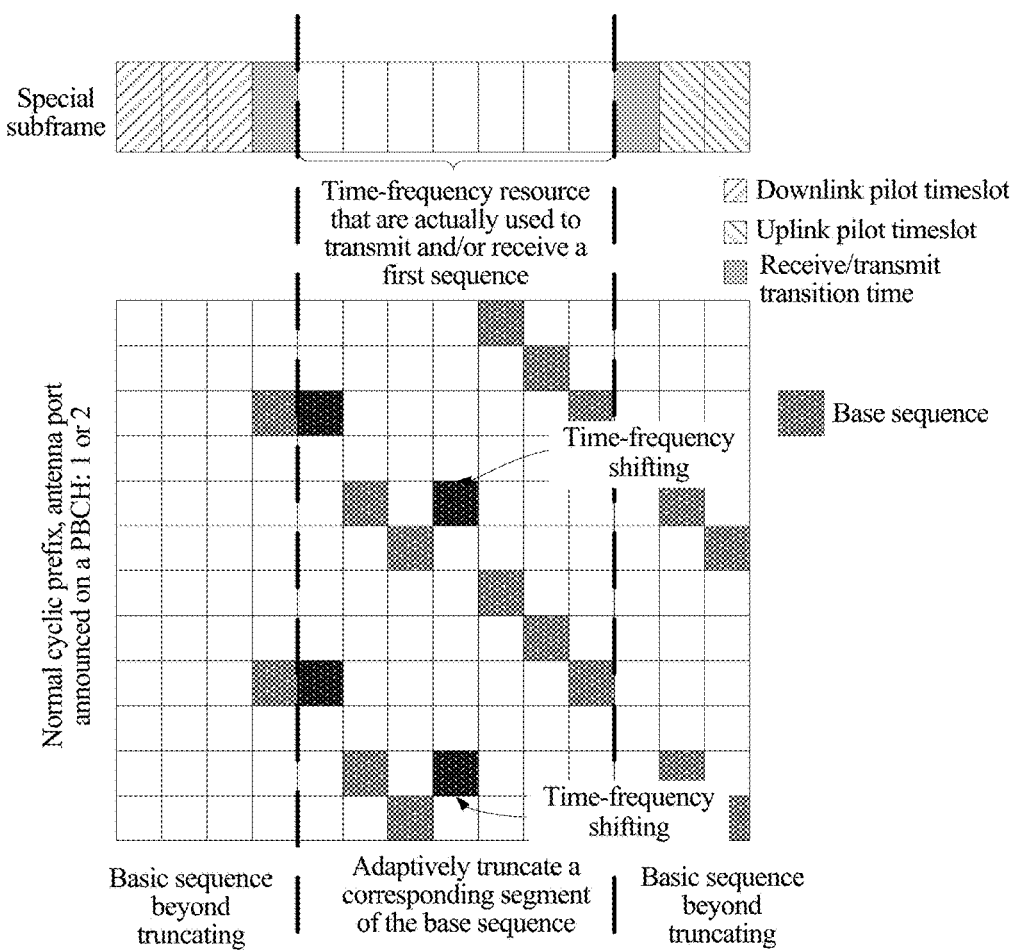
FIG. 10B is a schematic diagram of performing time-frequency shifting on a time-frequency resource that is not truncated in FIG. 10A.

In addition, after the time-frequency pattern of the base sequence is truncated, time-frequency shifting may be performed on a time-frequency pattern that is not truncated, for example, another time-frequency resource than the time-frequency resource between the two black bold dashed lines in FIG. 10A, so that all or some time-frequency patterns that are not truncated carry the time-frequency resource of the first sequence, that is, fall within an region between the two black bold dashed lines. Specifically, referring to FIG. 10B, FIG. 10B is a schematic diagram of performing time-frequency shifting on a time-frequency resource that is not truncated in FIG. 10A. As shown in FIG. 10B, two time-frequency resources that are not truncated may be time-frequency shifted into the truncated range.

A fourth transformation manner is expanding the time-frequency pattern of the base sequence, and using the expanded time-frequency pattern as the time-frequency pattern of the first sequence.

In this transformation manner, the time-frequency pattern of the base sequence is a subset of the time-frequency pattern of the first sequence. In this case, the time-frequency pattern of the first sequence can be obtained by expanding the time-frequency pattern of the base sequence.

A typical application scenario for this transformation manner includes: when the time-frequency resource that is actually used to transmit and/or receive the first sequence is larger than a time-frequency resource occupied by the time-frequency pattern of the base sequence, not only the time-frequency pattern of the base sequence may be directly used as the time-frequency pattern of the first sequence, but some segments of the base sequence may be carried on time-frequency resources that are actually used to transmit and/or receive the first sequence and that are not occupied by the time-frequency pattern of the base sequence.

A fifth transformation manner is performing time-frequency shifting on the time-frequency pattern of the base sequence, and using the time-frequency pattern obtained after time-frequency shifting as the time-frequency pattern of the first sequence. Specifically, reference may be made to a related description of the foregoing possible specific forms of the time-frequency pattern of the base sequence, and details are not described herein again.

It should be noted that transformation of the time-frequency pattern of the base sequence may further include any combination of the foregoing manners. For example, when a combination of puncturing and time-frequency shifting is considered, a base sequence carried on a punctured RE may be directly discarded, and then time-frequency shifting is performed on a pattern of a base sequence that is not punctured; or a base sequence carried on a punctured RE is time-frequency shifted to a time-frequency resource that may be used to transmit and/or receive the first sequence.

In addition, it should further be noted that the applicable typical scenarios in the foregoing various transformation manners are merely examples, and the present invention is not limited thereto. In another feasible implementation manner, the various transformation manners may be corresponding to other scenarios.

In addition, it should further be noted that in different subframes, transformations on the base sequence may be the same or may be different; in different timeslots included in a same subframe, transformations on the base sequence may be the same or may be different; or further, within different ranges of time resources included in a same subframe, transformations on the base sequence may be the same or may be different. In addition, for different antenna ports, transformations on the base sequence may be the same or may be different; for different frequency domain resource blocks (for example, in unit of PRBs), transformations on the base sequence may be the same or different. For different time-frequency patterns of first sequences, corresponding base sequences may use a same time-frequency pattern or may use time-frequency patterns that are time-frequency shifts of each other. The different time-frequency patterns of the first sequences may be located in a same subframe or may be located in different subframes.

In addition, it should further be noted that, in the present invention, for at least two network elements or user equipments of different synchronization levels, the time-frequency patterns of the base sequences may be the same or may be different; however, for network elements or user equipments of a same synchronization level, the time-frequency patterns of the base sequences are the same. For example, for a network element or user equipment whose synchronization level is less than a first specified threshold (for example, the synchronization level is less than 2, that is, a network element or user equipment whose synchronization level is 0 or 1), a time-frequency pattern of the PRS or PRS+CRS may be used as the time-frequency pattern of the base sequence; for a network element or user equipment whose synchronization level is greater than a second specified threshold (for example, a network element or user equipment whose synchronization level is greater than 1), the time-frequency pattern of the CRS may be used as the time-frequency pattern of the base sequence. In other words, a time-frequency pattern of a first sequence of a network element or user equipment whose synchronization level is less than a first specified threshold is obtained by transforming a time-frequency pattern of a PRS or PRS+CRS, and a time-frequency pattern of a first sequence of a network element or user equipment whose synchronization level is greater than a second specified threshold is obtained by transforming a time-frequency pattern of a CRS. In this example, similar to the foregoing description, the time-frequency pattern of the base sequence may be any one or a combination of time-frequency patterns of a PSS, an SSS, a CSI-RS, an MBSFN RS, a DMRS, and a DRS. In this example, a network element or user equipment with a lower synchronization level go through a smaller quantity of transition hops from an external synchronization source. Based on this characteristic, a network element or user equipment whose synchronization level is less than the first threshold can provide a more precise clock synchronization signal. In particular, when different network elements or user equipments belong to different operators, clock synchronization precision between different operators can be ensured.

In addition, it should further be noted that, in the present invention, for network elements or user equipments that are in different synchronization states, the time-frequency patterns of the base sequences may be the same or may be different. The different synchronization states include synchronized and unsynchronized, and the different synchronization states may further be indicated by whether clock synchronization provided by a network element or user equipment is reliable. For example, for a synchronized network element or a network element that can provide reliable clock synchronization, the PRS or PRS+CRS may be used as the time-frequency pattern of the base sequence; for an unsynchronized network element or a network element that cannot provide reliable clock synchronization, the CRS may be used as the time-frequency pattern of the base sequence. In other words, a time-frequency pattern of a first sequence transmitted by a synchronized network element or a network element that can provide reliable clock synchronization is obtained by transforming a time-frequency pattern of the PRS or PRS+CRS, and a time-frequency pattern of a first sequence transmitted by an unsynchronized network element or a network element that cannot provide reliable clock synchronization is obtained by transforming a time-frequency pattern of the CRS. In this example, similar to the foregoing description, the time-frequency pattern of the base sequence may be any one or a combination of time-frequency patterns of a PSS, an SSS, a CSI-RS, an MBSFN RS, a DMRS, and a DRS.

In addition, it should further be noted that, in the present invention, a network listening resource may appear periodically, for example, appear once every 10 s or 7.5 s, which is not limited herein.

Optionally, in the foregoing Embodiment 1, before determining, according to the type of the network listening resource, the time-frequency pattern that is of the first sequence and is corresponding to the network listening resource of this type, the first device further needs to determine a network listening resource in which the time-frequency pattern of the first sequence is located, where the network listening resource in which the first sequence is located includes at least one of the following resources: a MBSFN subframe, a guard period (GP) of a special subframe, an uplink subframe or another part of an uplink subframe except a unicast control region, and a downlink subframe or another part of a downlink subframe except a unicast control region. In this case, the first device generates the time-frequency pattern of the first sequence on the determined network listening resource according to the type of the network listening resource. The network listening resource in which the time-frequency pattern of the first sequence is located is implemented, for example, by the first device according to network configuration.

Further, optionally, when the first device is a frequency division duplex (FDD) standard device, the network listening resource is a MBSFN subframe; or when the first device is a time division duplex (TDD) standard device, the network listening resource is a MBSFN subframe, a GP of a special subframe, or an uplink subframe, thereby reducing an effect on user equipment served by the first device when the first device transmits the first sequence. The effect on user equipment includes: an effect on radio resource management (RRM) measurement of the user equipment, an effect on user data scheduling, and the like.

FIG. 11 is a flowchart of Embodiment 2 of a network listening method of the present invention. This embodiment is executed by a second device and is applicable to a scenario in which a network listening signal needs to be efficiently generated for network listening resources of different types. Specifically, this embodiment includes the following steps:

201. The second device receives a first sequence transmitted by a first device by using a time-frequency pattern of the first sequence, where the time-frequency pattern of the first sequence is a time-frequency pattern obtained by transforming a time-frequency pattern of a base sequence, and the time-frequency pattern of the first sequence is determined by the first device according to a type of a network listening resource.

In this step, for related descriptions of the type of the network listening resource, the first sequence, and the like, reference may be made to the foregoing Embodiment 1 in FIG. 2, and details are not described herein again.

202. The second device performs network listening according to the first sequence.

After receiving the first sequence transmitted by the first device by using the time-frequency pattern of the first sequence, the second device performs network listening according to the first sequence.

According to the network listening method provided in this embodiment of the present invention, after receiving a first sequence transmitted by a first device by using a time-frequency pattern of the first sequence, a second device performs network listening according to the first sequence. In this process, the time-frequency pattern of the first sequence is a time-frequency pattern obtained by transforming a time-frequency pattern of a base sequence, and a network listening signal obtained therefrom, that is, the time-frequency pattern of the first sequence, is simple, which can achieve a purpose of reducing complexity of generating a network listening signal and computational complexity of parsing a network listening signal.

Optionally, in the foregoing Embodiment 2, the time-frequency pattern of the first sequence may be determined by the first device by transforming the time-frequency pattern of the base sequence according to the type of the network listening resource; or may be determined by the first device according to a correspondence between the type of the network listening resource and the time-frequency pattern of the first sequence; or may be obtained by transforming the time-frequency pattern of the base sequence after the first device determines, according to a correspondence between the type of the network listening resource and a transformation manner of the time-frequency pattern of the base sequence, a transformation manner that is of the time-frequency pattern of the base sequence and is corresponding to the type of the network listening resource. Specifically, reference may be made to a related description in the foregoing Embodiment 1, and details are not described herein again.

Optionally, in the foregoing Embodiment 2, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

Optionally, in the foregoing Embodiment 2, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource.

Optionally, in the foregoing Embodiment 2, the network listening resource includes at least one of the following resources: a MBSFN subframe, a GP of a special subframe, an uplink subframe, and a downlink subframe; and the time-frequency pattern of the first sequence is generated by the first device on the network listening resource according to the type of the network listening resource.

Further, optionally, when the second device is a FDD standard device, the network listening resource is a MBSFN subframe; or when the second device is a TDD standard device, the network listening resource is a MBSFN subframe, a GP of a special subframe, or an uplink subframe, thereby reducing an effect caused by transmitting the first sequence by the first device to user equipment served by the first device. The effect on user equipment includes: an effect on RRM measurement of the user equipment, an effect on user data scheduling, and the like.

Optionally, in the foregoing Embodiment 2, the network listening resource includes at least one of the following resources: a subframe whose subframe index number is 1 and/or a subframe whose subframe index number is 6 in a FDD system; and a subframe whose subframe index number is 1 and/or a subframe whose subframe index number is 6 in a TDD system.

Optionally, in the foregoing Embodiment 2, a network listening resource in which the time-frequency pattern of the first sequence is located is determined by the first device according to network configuration.

Optionally, in the foregoing Embodiment 2, the time-frequency pattern of the base sequence is determined by the first device according to network configuration.

Optionally, in the foregoing Embodiment 2, the time-frequency pattern of the base sequence includes: a time-frequency pattern of a positioning reference signal (PRS) and/or a time-frequency pattern of a cell-specific reference signal (CRS).

FIG. 12 is a schematic structural diagram of Embodiment 1 of a first device according to the present invention. The first device provided in this embodiment is an apparatus embodiment corresponding to an embodiment of the present invention in FIG. 2, and a specific implementation process is not described herein again. Specifically, a first device 100 provided in this embodiment specifically includes:

a determining module 11, configured to determine, according to a type of a network listening resource, a time-frequency pattern that is of a first sequence and is corresponding to the type of the network listening resource, where the time-frequency pattern of the first sequence is a time-frequency pattern obtained by transforming a time-frequency pattern of a base sequence, and the first sequence is a sequence used by a second device to perform network listening; and a transmitting module 12, configured to transmit the first sequence to the second device by using the time-frequency pattern of the first sequence determined by the determining module 11.

After determining, according to a type of a network listening resource, a time-frequency pattern that is of a first sequence and is corresponding to the network listening resource of this type, the first device provided in this embodiment of the present invention transmits the first sequence to a second device by using the time-frequency pattern of the first sequence, so that the second device performs network listening according to the first sequence. The time-frequency pattern of the first sequence determined in this process is a time-frequency pattern obtained by transforming a time-frequency pattern of a base sequence, and a network listening signal obtained therefrom, that is, the time-frequency pattern of the first sequence, is simple, which can achieve a purpose of reducing complexity of generating a network listening signal and computational complexity of parsing a network listening signal.

Optionally, in an embodiment of the present invention, the determining module 11 is specifically configured to: transform the time-frequency pattern of the base sequence according to the type of the network listening resource, to determine the time-frequency pattern of the first sequence; or determine the time-frequency pattern of the first sequence according to a correspondence between the type of the network listening resource and the time-frequency pattern of the first sequence; or determine, according to a correspondence between the type of the network listening resource and a transformation manner of the time-frequency pattern of the base sequence, a transformation manner that is of the time-frequency pattern of the base sequence and is corresponding to the type of the network listening resource, so as to transform the time-frequency pattern of the base sequence to obtain the time-frequency pattern of the first sequence.

Optionally, in an embodiment of the present invention, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

Optionally, in an embodiment of the present invention, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource.

Optionally, in an embodiment of the present invention, the determining module 11 is specifically configured to: determine a network listening resource in which the time-frequency pattern of the first sequence is located, where the network listening resource includes at least one of the following resources: a MBSFN subframe, a GP of a special subframe, an uplink subframe, and a downlink subframe; and then generate the time-frequency pattern of the first sequence on the network listening resource according to the type of the network listening resource.

Optionally, in an embodiment of the present invention, when the first device is a FDD standard device, the network listening resource determined by the determining module 11 is a MBSFN subframe; or when the first device is a TDD standard device, the network listening resource determined by the determining module 11 is a MBSFN subframe, a GP of a special subframe, or an uplink subframe.

Optionally, in an embodiment of the present invention, the determining module 11 is further configured to: determine a network listening resource in which the time-frequency pattern of the first sequence is located, where the network listening resource includes at least one of the following resources: a subframe whose subframe index number is 1 and/or a subframe whose subframe index number is 6 in a FDD system, or a subframe whose subframe index number is 1 and/or a subframe whose subframe index number is 6 in a TDD system; and generate the time-frequency pattern of the first sequence on the network listening resource according to the type of the network listening resource.

Optionally, in an embodiment of the present invention, the determining module 11 is specifically configured to determine, according to network configuration, the network listening resource in which the time-frequency pattern of the first sequence is located.

Optionally, in an embodiment of the present invention, the determining module 11 is specifically configured to determine the time-frequency pattern of the base sequence according to network configuration.

Optionally, in an embodiment of the present invention, the time-frequency pattern of the base sequence includes: a time-frequency pattern of a PRS and/or a time-frequency pattern of a CRS.

FIG. 13 is a schematic structural diagram of Embodiment 1 of a second device according to the present invention. The second device provided in this embodiment is an apparatus embodiment corresponding to an embodiment of the present invention in FIG. 11, and a specific implementation process is not described herein again. Specifically, a second device 200 provided in this embodiment specifically includes:

a receiving module 21, configured to receive a first sequence transmitted by a first device by using a time-frequency pattern of the first sequence, where the time-frequency pattern of the first sequence is a time-frequency pattern obtained by transforming a time-frequency pattern of a base sequence, and the time-frequency pattern of the first sequence is determined by the first device according to a type of a network listening resource; and a network listening module 22, configured to perform network listening according to the first sequence received by the receiving module 21.

After receiving a first sequence transmitted by a first device by using a time-frequency pattern of the first sequence, the second device provided in this embodiment of the present invention performs network listening according to the first sequence. In this process, the time-frequency pattern of the first sequence is a time-frequency pattern obtained by transforming a time-frequency pattern of a base sequence, and a network listening signal obtained therefrom, that is, the time-frequency pattern of the first sequence, is simple, which can achieve a purpose of reducing complexity of generating a network listening signal and computational complexity of parsing a network listening signal.

Optionally, in an embodiment of the present invention, the time-frequency pattern of the first sequence may be: determined by the first device by transforming the time-frequency pattern of the base sequence according to the type of the network listening resource; or determined by the first device according to a correspondence between the type of the network listening resource and the time-frequency pattern of the first sequence; or obtained by transforming the time-frequency pattern of the base sequence after the first device determines, according to a correspondence between the type of the network listening resource and a transformation manner of the time-frequency pattern of the base sequence, a transformation manner that is of the time-frequency pattern of the base sequence and is corresponding to the type of the network listening resource.

Optionally, in an embodiment of the present invention, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

Optionally, in an embodiment of the present invention, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource.

Optionally, in an embodiment of the present invention, the network listening resource includes at least one of the following resources: a MBSFN subframe, a GP of a special subframe, an uplink subframe, and a downlink subframe; and the time-frequency pattern of the first sequence is generated by the first device on the network listening resource according to the type of the network listening resource.

Optionally, in an embodiment of the present invention, when the second device is a FDD standard device, the network listening resource is a MBSFN subframe; or when the second device is a TDD standard device, the network listening resource is a MBSFN subframe, a GP of a special subframe, or an uplink subframe.

Optionally, in an embodiment of the present invention, the network listening resource includes at least one of the following resources: a subframe whose subframe index number is 1 and/or a subframe whose subframe index number is 6 in a FDD system, and a subframe whose subframe index number is 1 and/or a subframe whose subframe index number is 6 in a TDD system; and the time-frequency pattern of the first sequence is generated by the first device on the network listening resource according to the type of the network listening resource.

Optionally, in an embodiment of the present invention, a network listening resource in which the time-frequency pattern of the first sequence is located is determined by the first device according to network configuration.

Optionally, in an embodiment of the present invention, the time-frequency pattern of the base sequence is determined by the first device according to network configuration.

Optionally, in an embodiment of the present invention, the time-frequency pattern of the base sequence includes: a time-frequency pattern of a PRS and/or a time-frequency pattern of a CRS.

Figure 14:
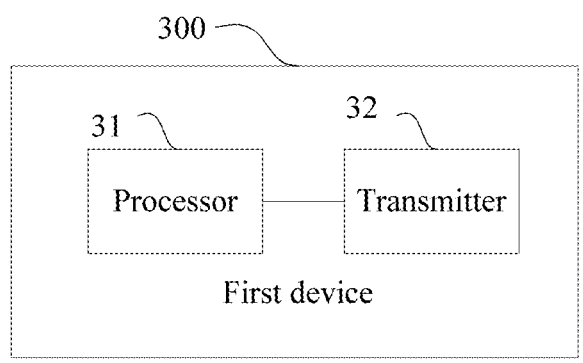
FIG. 14 is a schematic structural diagram of Embodiment 2 of a first device according to the present invention.

FIG. 14 is a schematic structural diagram of Embodiment 3 of a first device according to the present invention. The first device provided in this embodiment is an apparatus embodiment corresponding to an embodiment of the present invention in FIG. 2, and a specific implementation process is not described herein again. Specifically, a first device 300 provided in this embodiment specifically includes:

a processor 31, configured to deter mine, according to a type of a network listening resource, a time-frequency pattern that is of a first sequence and is corresponding to the type of the network listening resource, where the time-frequency pattern of the first sequence is a time-frequency pattern obtained by transforming a time-frequency pattern of a base sequence, and the first sequence is a sequence used by a second device to perform network listening; and a transmitter 32, configured to transmit the first sequence to the second device by using the time-frequency pattern of the first sequence determined by the processor 31.

Optionally, in an embodiment of the present invention, the processor 31 is specifically configured to: transform the time-frequency pattern of the base sequence according to the type of the network listening resource, to determine the time-frequency pattern of the first sequence; or determine the time-frequency pattern of the first sequence according to a correspondence between the type of the network listening resource and the time-frequency pattern of the first sequence; or determine, according to a correspondence between the type of the network listening resource and a transformation manner of the time-frequency pattern of the base sequence, a transformation manner that is of the time-frequency pattern of the base sequence and is corresponding to the type of the network listening resource, so as to transform the time-frequency pattern of the base sequence to obtain the time-frequency pattern of the first sequence.

Optionally, in an embodiment of the present invention, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

Optionally, in an embodiment of the present invention, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource.

Optionally, in an embodiment of the present invention, the processor 31 is specifically configured to: determine a network listening resource in which the time-frequency pattern of the first sequence is located, where the network listening resource includes at least one of the following resources: a MBSFN, a GP of a special subframe, an uplink subframe, and a downlink subframe; and generate the time-frequency pattern of the first sequence on the network listening resource according to the type of the network listening resource.

Optionally, in an embodiment of the present invention, when the first device is a FDD standard device, the network listening resource determined by the processor 31 is a MBSFN subframe; or when the first device is a TDD standard device, the network listening resource determined by the processor 31 is a MBSFN subframe, a GP of a special subframe, or an uplink subframe.

Optionally, in an embodiment of the present invention, the processor 31 is specifically configured to: determine a network listening resource in which the time-frequency pattern of the first sequence is located, where the network listening resource includes at least one of the following resources: a subframe whose subframe index number is 1 and/or a subframe whose subframe index number is 6 in a FDD system, or a subframe whose subframe index number is 1 and/or a subframe whose subframe index number is 6 in a TDD system; and generate the time-frequency pattern of the first sequence on the network listening resource according to the type of the network listening resource.

Optionally, in an embodiment of the present invention, the processor 31 is specifically configured to determine, according to network configuration, the network listening resource in which the time-frequency pattern of the first sequence is located.

Optionally, in an embodiment of the present invention, the processor 31 is specifically configured to determine the time-frequency pattern of the base sequence according to network configuration.

Optionally, in an embodiment of the present invention, the time-frequency pattern of the base sequence includes: a time-frequency pattern of a PRS and/or a time-frequency pattern of a CRS.

Figure 15:
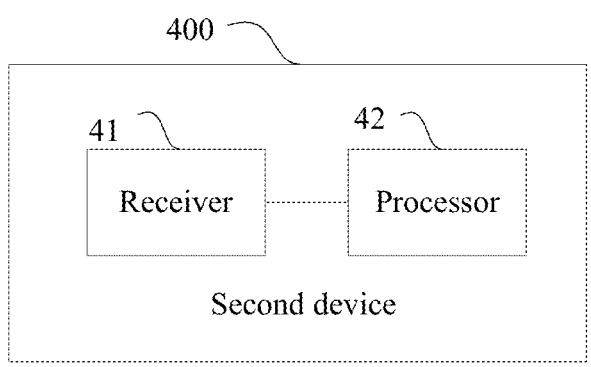
FIG. 15 is a schematic structural diagram of Embodiment 2 of a second device according to the present invention.

FIG. 15 is a schematic structural diagram of Embodiment 2 of a second device according to the present invention. The second device provided in this embodiment is an apparatus embodiment corresponding to an embodiment of the present invention in FIG. 11, and a specific implementation process is not described herein again. Specifically, a second device 400 provided in this embodiment specifically includes:

a receiver 41, configured to receive a first sequence transmitted by a first device by using a time-frequency pattern of the first sequence, where the time-frequency pattern of the first sequence is a time-frequency pattern obtained by transforming a time-frequency pattern of a base sequence, and the time-frequency pattern of the first sequence is determined by the first device according to a type of a network listening resource; and a processor 42, configured to perform network listening according to the first sequence received by the receiver 41.

Optionally, in an embodiment of the present invention, the time-frequency pattern of the first sequence may be: determined by the first device by transforming the time-frequency pattern of the base sequence according to the type of the network listening resource; or determined by the first device according to a correspondence between the type of the network listening resource and the time-frequency pattern of the first sequence; or obtained by transforming the time-frequency pattern of the base sequence after the first device determines, according to a correspondence between the type of the network listening resource and a transformation manner of the time-frequency pattern of the base sequence, a transformation manner that is of the time-frequency pattern of the base sequence and is corresponding to the type of the network listening resource.

Optionally, in an embodiment of the present invention, time-frequency patterns that are of first sequences and are respectively corresponding to network listening resources of different types are time-frequency patterns obtained by transforming time-frequency patterns of a same base sequence, and the time-frequency patterns that are of the first sequences and are respectively corresponding to the network listening resources of different types are the same or different.

Optionally, in an embodiment of the present invention, the time-frequency pattern obtained by transforming the time-frequency pattern of the base sequence includes at least one of the following time-frequency patterns: a time-frequency pattern obtained by puncturing the time-frequency pattern of the base sequence, a time-frequency pattern obtained by truncating the time-frequency pattern of the base sequence, a time-frequency pattern obtained by performing time-frequency shifting on the time-frequency pattern of the base sequence, and a time-frequency pattern obtained by expanding the time-frequency pattern of the base sequence, where the performing time-frequency shifting on the time-frequency pattern of the base sequence is specifically translating the time-frequency pattern of the base sequence on a frequency resource and/or a time resource.

Optionally, in an embodiment of the present invention, the network listening resource includes at least one of the following resources: a MBSFN subframe, a GP of a special subframe, an uplink subframe, and a downlink subframe; and the time-frequency pattern of the first sequence is generated by the first device on the network listening resource according to the type of the network listening resource.

Optionally, in an embodiment of the present invention, when the second device is a FDD standard device, the network listening resource is a MBSFN subframe; or when the second device is a TDD standard device, the network listening resource is a MBSFN subframe, a GP of a special subframe, or an uplink subframe.

Optionally, in an embodiment of the present invention, the network listening resource includes at least one of the following resources: a subframe whose subframe index number is 1 and/or a subframe whose subframe index number is 6 in a FDD system, and a subframe whose subframe index number is 1 and/or a subframe whose subframe index number is 6 in a TDD system; and the time-frequency pattern of the first sequence is generated by the first device on the network listening resource according to the type of the network listening resource.

Optionally, in an embodiment of the present invention, a network listening resource in which the time-frequency pattern of the first sequence is located is determined by the first device according to network configuration.

Optionally, in an embodiment of the present invention, the time-frequency pattern of the base sequence is determined by the first device according to network configuration.

Optionally, in an embodiment of the present invention, the time-frequency pattern of the base sequence includes: a time-frequency pattern of a PRS and/or a time-frequency pattern of a CRS.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A clock synchronization method, comprising:
   determining, by a first base station, a clock synchronization signal and a time-frequency pattern of the clock synchronization signal, wherein the clock synchronization signal is a sequence having a fixed time-frequency pattern, the time-frequency pattern of the clock synchronization signal is the fixed time-frequency pattern, and the fixed time-frequency pattern comprises a time-frequency pattern of a positioning reference signal (PRS) and a time-frequency pattern of a cell-specific reference signal (CRS); and
   transmitting, by the first base station by using the time-frequency pattern of the clock synchronization signal, the clock synchronization signal to a second base station for clock synchronization between the second base station and the first base station, wherein when the method is performed in a frequency division duplex (FDD) system, the time-frequency pattern of the clock synchronization signal is located in a first resource, the first resource comprises a subframe whose subframe index number is 1 and/or a subframe whose subframe index number is 6 in the FDD system.

2. The method according to claim 1,
   wherein the first resource further comprises a multimedia broadcast multicast service single frequency network (MBSFN) subframe.

3. The method according to claim 1,
   wherein when the method is performed in a time division duplex (TDD) system, the time-frequency pattern of the clock synchronization signal is located in a second resource,
   the second resource comprises a subframe whose subframe index number is 1 and/or a subframe whose subframe index number is 6 the TDD system.

4. A clock synchronization method, comprising:
   receiving, by a second base station, a clock synchronization signal from a first base station by using a time-frequency pattern of the clock synchronization signal, wherein the clock synchronization signal is a sequence having a fixed time-frequency pattern, the time-frequency pattern of the clock synchronization signal is the fixed time-frequency pattern, and the fixed time-frequency pattern comprises a time-frequency pattern of a positioning reference signal (PRS) and a time-frequency pattern of a cell-specific reference signal (CRS), wherein when the method is performed in a frequency division duplex (FDD) system, the time-frequency pattern of the clock synchronization signal is located in a resource, the resource comprises a subframe whose subframe index number is 1 and/or a subframe whose subframe index number is 6 in the FDD system; and
   performing, by the second base station, clock synchronization between the second base station and the first base station according to the clock synchronization signal.

5. The method according to claim 4, wherein:
   the first resource further comprises a multimedia broadcast multicast service single frequency network (MBSFN) subframe.

6. The method according to claim 4, wherein when the method is performed in a time division duplex (TDD) system,
   the time-frequency pattern of the clock synchronization signal is located in a second resource, the second resource comprises
   a subframe whose subframe index number is 1 and/or a subframe whose subframe index number is 6 in the TDD system.

7. A first base station, comprising:
   a processor, configured to determine a clock synchronization signal and a time-frequency pattern of the clock synchronization signal, wherein the clock synchronization signal is a sequence having a fixed time-frequency pattern, the time-frequency pattern of the clock synchronization signal is the fixed time-frequency pattern, and the fixed time-frequency pattern comprises a time-frequency pattern of a positioning reference signal (PRS) and a time-frequency pattern of a cell-specific reference signal (CRS); and
   a transmitter, configured to transmit, by using the time-frequency pattern of the clock synchronization signal determined by the processor, the clock synchronization signal to a second base station for clock synchronization between the second base station and the first base station, wherein when the method is performed in a frequency division duplex (FDD) system, the time-frequency pattern of the clock synchronization signal is located in a first resource, the first resource comprises a subframe whose subframe index number is 1 and/or a subframe whose subframe index number is 6 in the FDD system.

8. The first base station according to claim 7,
   wherein the first resource comprises a multimedia broadcast multicast service single frequency network (MBSFN) subframe.

9. The first base station according to claim 7, wherein when the method is performed in a time division duplex (TDD) system,
   the time-frequency pattern of the clock synchronization signal is located in a second resource, the second resource comprises
   a subframe whose subframe index number is 1 and/or a subframe whose subframe index number is 6 in the TDD system.

10. A second base station, comprising:
    a receiver, configured to receive a clock synchronization signal from a first base station by using a time-frequency pattern of the clock synchronization signal, wherein the clock synchronization signal is a sequence having a fixed time-frequency pattern, the time-frequency pattern of the clock synchronization signal is the fixed time-frequency pattern, and the fixed time-frequency pattern comprises a time-frequency pattern of a positioning reference signal (PRS) and a time-frequency pattern of a cell-specific reference signal (CRS), wherein when the method is performed in a frequency division duplex (FDD) system, the time-frequency pattern of the clock synchronization signal is located in a resource, the resource comprises a subframe whose subframe index number is 1 and/or a subframe whose subframe index number is 6 in the FDD system; and
    a processor, configured to perform clock synchronization between the second base station and the first base station according to the clock synchronization signal received by the receiver.

11. The second base station according to claim 10, wherein:
    the first resource further comprises a multicast-broadcast single-frequency network MBSFN subframe.

12. The second base station according to claim 10, wherein when the method is performed in a time division duplex (TDD) system, the time-frequency pattern of the clock synchronization signal is located in a second resource, the second resource comprises a subframe whose subframe index number is 1 and/or a subframe whose subframe index number is 6 in the TDD system.

13. The method according to claim 1, wherein the time-frequency pattern of the clock synchronization signal is all or some time-frequency resources included in a guard period (GP) of a special subframe.

14. The method according to claim 4, wherein the time-frequency pattern of the clock synchronization signal is all or some time-frequency resources included in a guard period (GP) of a special subframe.

15. The first base station according to claim 7, wherein the time-frequency pattern of the clock synchronization signal is all or some time-frequency resources included in a guard period (GP) of a special subframe.

16. The second base station according to claim 10, wherein the time-frequency pattern of the clock synchronization signal is all or some time-frequency resources included in a guard period (GP) of a special subframe.

17. The method according to claim 1, wherein the first resource further comprises an uplink subframe.

18. The method according to claim 1, wherein the first resource further comprises a downlink subframe.

19. The method according to claim 4, wherein the first resource further comprises an uplink subframe.

20. The method according to claim 4, wherein the first resource further comprises a downlink subframe.

* * * * *